(12) United States Patent
Kudo et al.

(10) Patent No.: US 7,532,370 B2
(45) Date of Patent: May 12, 2009

(54) OPTICAL ENCODER, MOTOR DRIVER AND IMAGE FORMING APPARATUS

(75) Inventors: Koichi Kudo, Tokyo (JP); Takuroh Kamiya, Tokyo (JP); Katsuya Kawagoe, Tokyo (JP); Ryuuichi Mimbu, Tokyo (JP); Junya Takigawa, Tokyo (JP); Toshiyuki Andoh, Tokyo (JP); Yoshihiro Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1063 days.

(21) Appl. No.: 10/724,998

(22) Filed: Dec. 2, 2003

(65) Prior Publication Data

US 2004/0160646 A1  Aug. 19, 2004

(30) Foreign Application Priority Data

| Dec. 2, 2002 | (JP) | ............................ 2002-350092 |
| Dec. 3, 2002 | (JP) | ............................ 2002-351218 |

(51) Int. Cl.
  *H04N 1/04* (2006.01)
  *H04N 1/46* (2006.01)
(52) U.S. Cl. .................. 358/474; 358/509; 358/539
(58) Field of Classification Search ............ 358/474, 358/509, 539
  See application file for complete search history.

(56) References Cited

U.S. PATENT DOCUMENTS

| 6,914,234 | B2 * | 7/2005 | Yasuda et al. .............. 250/225 |
| 2003/0044211 | A1 * | 3/2003 | Sugaya et al. ............... 400/76 |
| 2003/0052287 | A1 * | 3/2003 | Iino et al. ................. 250/559.29 |
| 2004/0160646 | A1 | 8/2004 | Kudo et al. |
| 2004/0164691 | A1 | 8/2004 | Andoh et al. |

FOREIGN PATENT DOCUMENTS

| JP | 59-224515 |   | 12/1984 |
| JP | 6-263281 |   | 9/1994 |
| JP | 07-306058 | * | 11/1995 |
| JP | 9-114348 |   | 5/1997 |
| JP | 10-339984 |   | 12/1998 |
| JP | 11-024507 | * | 1/1999 |
| JP | 11-183200 |   | 7/1999 |
| JP | 2002-40727 |   | 2/2002 |
| JP | 2002-108169 |   | 4/2002 |

OTHER PUBLICATIONS

U.S. Appl. No. 11/267,402, filed Nov. 7, 2005, Iijima et al.
U.S. Appl. No. 10/724,998, filed Dec. 2, 2003, Kudo et al.
U.S. Appl. No. 11/045,292, filed Jan. 31, 2005, Kamiya.

(Continued)

*Primary Examiner*—Houshang Safaipour
(74) *Attorney, Agent, or Firm*—Oblon, Spivak, McClelland, Maier & Neustadt, P.C.

(57) ABSTRACT

An optical encoder includes a light emitting unit that emits parallel light onto a plurality of marks that are arranged on an object such as a rotor or a belt, at a predetermined interval in a moving direction of the object, and a light receiving unit that receives light modulated by the marks. The parallel light is generated by a collimating lens.

35 Claims, 27 Drawing Sheets

OTHER PUBLICATIONS

U.S. Appl. No. 11/740,570, filed Apr. 26, 2007, Kawagoe.
U.S. Appl. No. 10/893,391, filed Jul. 19, 2004, Yokoyama et al.
U.S. Appl. No. 11/219,741, filed Sep. 7, 2005, Takigawa et al.
U.S. Appl. No. 10/927,344, filed Aug. 27, 2004, Takayama et al.
U.S. Appl. No. 10/937,447, filed Sep. 10, 2004, Komatsu et al.
U.S. Appl. No. 10/942,877, filed Sep. 17, 2004, Sakai.

* cited by examiner

OPTICAL ENCODER, MOTOR DRIVER AND IMAGE FORMING APPARATUS

CROSS-REFERENCE TO RELATED APPLICATIONS

The present document incorporates by reference the entire contents of Japanese priority documents, 2002-350092 filed in Japan on Dec. 2, 2003 and 2002-351218 filed in Japan on Dec. 3, 2003.

BACKGROUND OF THE INVENTION

1) Field of the Invention

The present invention relates to an optical, encoder, a motor driver, and an image forming apparatus. Particularly, the present invention relates to a motor driver that controls a driving of a belt member such as a photosensitive belt and an intermediate transfer belt, and an image forming apparatus such as a copying machine, a printer, and a facsimile having this motor driver.

2) Description of the Related Art

In an image forming apparatus, a drive control device, which controls a driving of a belt member that is utilized to form an image, such as a photosensitive belt, an intermediate transfer belt, and a paper transfer belt, is installed. In order to control the driving of the belt member to form an image, it is necessary to carry out a positioning of an image in high precision on the surface of the belt member or on the surface of a recording member that is conveyed by the belt member. In other words, in the image forming apparatus, the precision of a moving quantity of the belt member per unit time and the precision of a position (moving position) at a predetermined point on the belt member at a predetermined time give a large influence to the quality of the image formed. Therefore, in such a drive control device, it is required to control in high precision the moving quantity of the belt member per unit time and the moving position of the belt member at a predetermined time. However, the moving speed of the belt member can easily change due to various factors such as a change in the load of a member that is brought into contact with the belt member, and therefore, it is extremely difficult to entirely eliminate the change in the speed of the belt member. As a result, in such a drive control device, it is difficult to control in high precision the moving quantity of the belt member per unit time and the moving position of the belt member at a predetermined time.

Japanese Patent Application Laid Open No. H9-114348 discloses a drive control device that has marks formed on the front surface or the back surface of an endless belt member, and when a sensor detects the marks, the drive control device feeds back a result of the detection to a drive control. Specifically, a plurality of marks is continuously formed on the belt member at equal intervals on the surface moving direction of the belt member such as a recording paper conveyer belt. A mark detector detects these marks. This device directly observes a movement of the belt member itself. Therefore, this device can carry out the drive control in higher precision than that of a device that carries out the drive control based on a rotary angle speed of a supporting roller that supports the belt member.

In various kinds of image forming apparatuses, it is highly necessary to precisely control a move or a displacement of moving members that are included in the device. For example, in a digital color copying apparatus, runs of a latent image carrier that is formed in a drum shape, an intermediate transfer belt that is used to transfer a toner image, and a sheet conveyer belt that conveys transfer paper respectively need to be controlled in high precision. Therefore, the run control with an encoder is essential.

In encoders, generally, a main scale is provided on the running surface of a shifter. An index scale is disposed close to this main scale. Light from a light source is emitted onto the main scale. A light receiver receives, through the index scale, the light that is reflected from the main scale or the light that is transmitted through the main scale. The run of the shifter is detected by utilizing a change in the intensity of the received light following a relative positional displacement between the main scale and the index scale following the running of the shifter.

As an example application of the run control of a shifter using the encoder to the image forming apparatus, the following method is known. Marks are formed on the surface of a belt as a shifter. A sensor detects the marks, calculates a belt surface speed based on a pulse interval obtained, and feeds back the belt surface speed to the control (for example, see Japanese Patent Application Laid Open Publications No. H6-263281 and No. H9-114348).

According to this method of feedback, as the movement of the belt surface can be observed directly, a move quantity of the belt surface can be controlled directly.

In general, it is extremely difficult to form a belt member in a uniform thickness in the belt moving direction. The thickness of the belt member changes when the belt member is deformed due to a tension applied to the belt during the move of the belt. Therefore, during the movement of the belt member, an interval between the marks formed on the belt member and the mark detector changes. At the time of detecting the marks at a belt portion between a plurality of supporting members that support the belt member, the interval between the marks and the mark detector changes when the belt portion vibrates. As explained above, when the interval changes, the distance (a detection distance) between the mark detector and the marks changes at each detection timing. Consequently, a detection error occurs when the mark detector optically detects the marks. This problem will be explained in more detail below.

FIG. 29 is a schematic configuration diagram of a belt drive unit that drives a belt member 560. This belt drive unit includes a belt driving motor 581 as a driving force transmitter that generates a driving force to drive a driving roller 562 as a supporting member to support the belt member 560, and a decelerator 584. When the driving force is transmitted from the belt driving motor 581 to the driving roller 562 via the decelerator 584, the belt member 560 moves to a direction shown in the drawing. This belt drive unit also includes a mark sensor 590 as a mark detector that detects mark holes 585 provided on the belt member 560. These marks 585 provided on the belt member 560 consist of a plurality of through-holes that continue at a constant interval in a belt moving direction. The mark sensor 590 includes a transmission-type photo interrupter that has a light emitter and a light receiver disposed oppositely.

FIGS. 30A and 30B are enlarged views of a portion of the belt member 560 that faces the mark sensor 590. FIGS. 30C and 30D are graphs illustrating an output waveform of the mark sensor 590 corresponding to FIGS. 30A and 30B respectively. When the mark holes 585 move following the movement of the belt member 560, the light emitted from a light emitting element 591 of the mark sensor 590 is transmitted through only the mark hole portions. A light receiving element 592 intermittently receives the transmitted light. Therefore, the mark sensor 590 forms output waveforms as shown in FIGS. 30C and 30D. Conventionally, the light emitting element 591 that is used in the mark sensor 590 emits light in a radial shape with a center of the light around the light emitting element 591.

Therefore, for example, when a detection distance L1 between the light emitting element 591 and the belt surface shown in FIG. 30A changes to a detection distance L2 shown in FIG. 30B, a cross-sectional length of the light emitted on a virtual plane C including the light receiving surface of the light receiving element 592 becomes large in the belt moving direction. Consequently, the light receiving element 592 starts receiving the light that is transmitted through one mark hole 585, at an early timing. Further, the light receiving element 592 ends receiving the light at a late timing.

Therefore, when the mark interval is small, before ending the reception of the light, the light receiving element 592 starts receiving the light that is transmitted through the next mark hole 585. In this case, the output form of the mark sensor 590 has a small difference between a low level and a high level as shown in FIG. 30D. When the mark interval is sufficiently large, the difference between the low level and the high level can be made large even when the detection distance changes as described above. However, as the drive control of the belt member for image formation is required to have high precision, it is also important that a sampling interval for detecting a mark is small as far as possible. Therefore, the interval between the marks needs to be small, and the output waveform as shown in FIG. 30D is obtained. Based on the output waveform, for example, when the output is pulsed at a certain threshold value, a duty ratio of the pulse changes. In this case, when the marks are detected at a leading time or a trailing time of the pulse, an error occurs in the mark detection timing.

A detailed error will be examined by taking the following assumption. The mark holes 585 are formed in 1 millimeter L/S (line and space) in the belt moving direction. The interval between the light emitting element 591 and the mark hole 585, and the interval between the light receiving element 592 and the mark interval 585 are the same of 1 millimeter (the detection distance L1=1 millimeter in FIG. 30A). The end of the mark hole 585 in the belt moving direction is on a virtual line that connects between the center of the light emitting element 591 and the center of the light receiving element 592. In this case, a divergence angle of the light that is transmitted through the mark hole 585 becomes 45 degrees. Therefore, the cross-sectional length of the light on the virtual plane C in the belt moving direction shown in FIG. 30A becomes 2 millimeters. In this state, when the mark hole 585 moves toward the light emitting element 591 by only 0.5 millimeter (the detection distance L2=0.5 millimeter in FIG. 30B), the divergence angle becomes 60 degrees. Consequently, the cross-sectional length of the light on the virtual plane C in the belt moving direction shown in FIG. 30B becomes 4 millimeters. Therefore, when the end of the mark hole 585 in the belt moving direction is on the virtual line that connects between the center of the light emitting element 591 and the center of the light receiving element 592, an error of 1 millimeter already occurs. In the image forming apparatus of 600 dots per inch, the line interval of an image corresponding to a belt moving direction is 42 micrometers. In order to increase the positional precision of the line of each image, the mark detection interval also needs to be decreased corresponding to this short line interval. Therefore, the error of this 1 millimeter is extremely large. In the configuration shown in FIG. 29, a deviation in the detection distance of the 0.5 millimeters could occur sufficiently. Even when the deviation in the detection distance is controlled with a known tool that stabilizes the belt run, a deviation of about 0.1 millimeter cannot be avoided.

In the above explanation, a transmission-type mark sensor is taken up as an example. Therefore, the vibration of the belt member affects large the detection error, and the deviation in the thickness of the belt member does not substantially affect the detection error. However, the detection error similarly occurs in a reflection-type mark sensor. In this case, in addition to the vibration of the belt member, the deviation in the thickness of the belt member also affects large the detection error. The detection error occurs in not only the belt member for image formation. The detection error is also a serious problem in a belt member for which a moving quantity per unit time and a moving position at a predetermined time are required to be controlled in high precision, like the belt member for image formation.

In order to increase the precision in the resolution with the encoder according to the conventional method, it is necessary to utilize a main scale having a small lattice constant. In order to maintain the contrast, the main scale and the index scale need to be disposed close to each other.

In other words, the image forming apparatus using the conventional encoder needs to satisfy the following. When the main scale is formed on the surface of the belt or the drum to structure a reflection-type encoder in order to measure a surface moving quantity of the intermediate transfer belt or the transfer paper conveyer belt, it is necessary to provide a certain level of gap between both scales to avoid a vertical move due to ruffling of the belt during the belt running, or a contact between the main scale and the index scale due to an eccentricity of the drum. When the gap between the scales varies or when the main scale is inclined from a normal state, the position of the reflection light incident to the light receiver changes. This has a risk of the occurrence of a measurement error.

SUMMARY OF THE INVENTION

It is an object of the present invention to at least solve the problems in the conventional technology.

An optical encoder according to one aspect of the present invention includes a light emitting unit that emits parallel light onto a plurality of marks that are arranged on an object at a predetermined interval in a moving direction of the object; and a light receiving unit that receives light modulated by the marks.

An optical encoder according to another aspect of the present invention includes a light emitting unit that emits light onto a plurality of marks that are arranged on an object at a predetermined interval in a moving direction of the object; a light receiving unit that receives light modulated by the marks; a slit member that has an aperture whose width is approximately equal to the predetermined interval, the light emitted from the light emitting unit passing through the aperture; a gap holding member that holds the slit member so that there is substantially a constant gap between the slit member and the marks; and a pressing member to elastically press the slit member against the marks through the gap holding member.

A driver for a motor to move an object according to still another aspect of the present invention includes the optical encoder according to the present invention and a motor controller that controls the motor based on a signal output from the light receiving unit.

An image forming apparatus according to still another aspect of the present invention includes an object on which a plurality of marks are arranged at a predetermined interval in a moving direction of the object; a motor to move the object; the optical encoder according to the present invention; and a motor controller that controls the motor based on a signal output from the light receiving unit.

A method of driving a motor to move an object on which a plurality of marks are arranged at a predetermined interval in a moving direction of the object, according to still another aspect of the present invention, includes emitting parallel light onto the marks; converting light modulated by the marks into an electric signal; and controlling the motor based on the electric signal.

A method of driving a motor to move an object on which a plurality of marks are arranged at a predetermined interval in a moving direction of the object, according to still another aspect of the present invention, includes pressing a slit member against the marks so that there is substantially a constant gap between the slit member and the marks, the slit member having an aperture; emitting parallel light onto the marks so that the light passes through the aperture; converting light modulated by the marks into an electric signal; and controlling the motor based on the electric signal.

The other objects, features and advantages of the present invention are specifically set forth in or will become apparent from the following detailed descriptions of the invention when read in conjunction with the accompanying drawings.

DETAILED DESCRIPTION

Exemplary embodiments of a drive control device, an optical encoder, and an image forming apparatus relating to the present invention will be explained in detail below with reference to the accompanying drawings.

The application of a drive control device to an electrophotographic color laser printer (hereinafter, "laser printer") as an image forming apparatus according to a first embodiment of the present invention will be explained.

Figure 2:
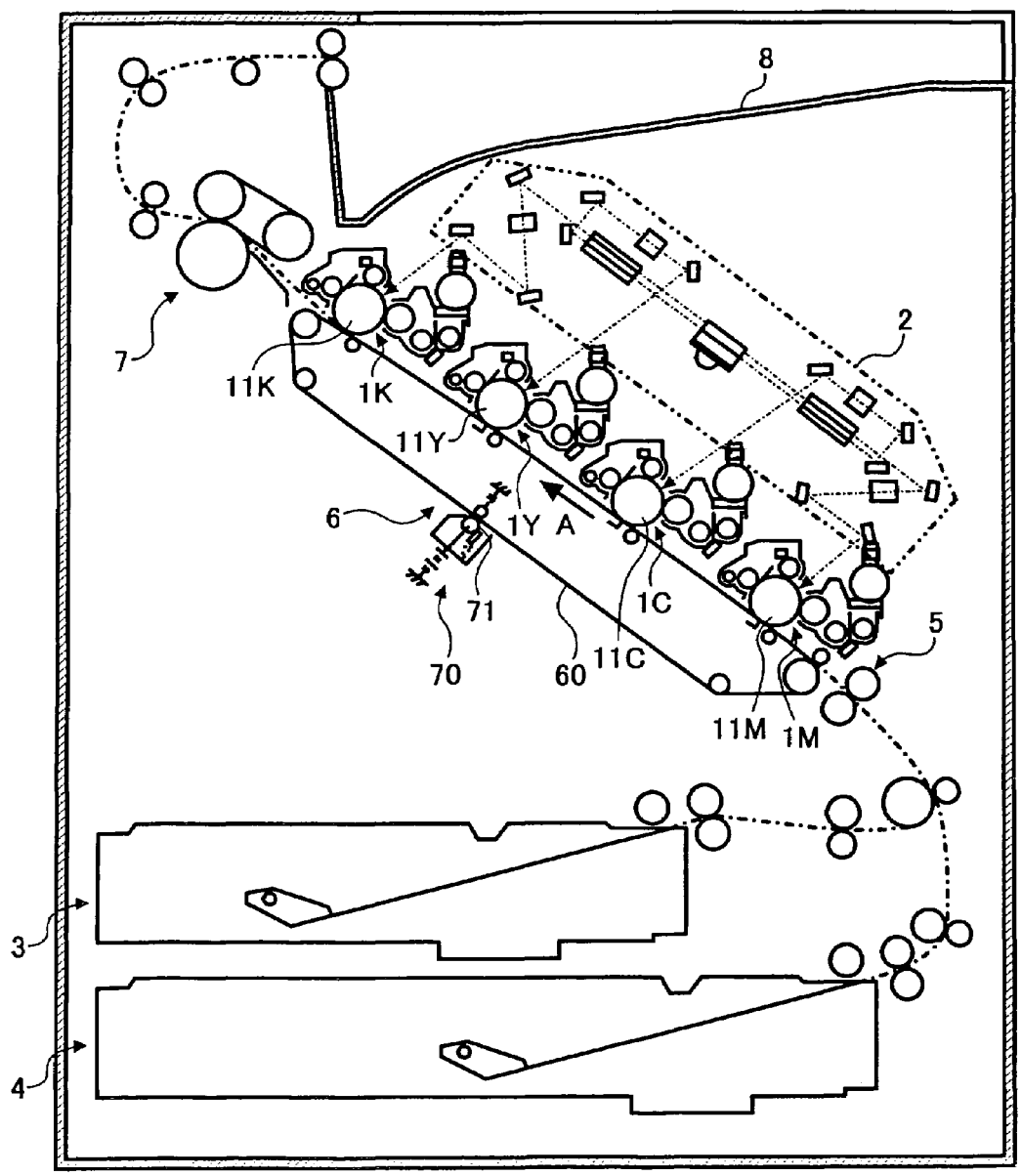
FIG. 2 is a schematic diagram of a laser printer according to a first embodiment.

FIG. 2 is a schematic diagram of the laser printer according to the first embodiment. This laser printer has four sets of image formation units disposed sequentially from the upstream of a transferred material as a recording material in its moving direction (a direction of an arrow mark A). The four sets of image formation units include 1M, 1C, 1Y, and 1K (hereinafter, indexes M, C, Y, and K represent magenta, cyan, yellow, and black color materials) respectively to form images in colors magenta (M), cyan (C), yellow (Y), and black (K) respectively.

Each of the image formation units1M, 1C, 1Y, and 1K has a photosensitive unit and a developing unit. The photosensitive unit has photosensitive drums 11M, 11C, 11Y, and 11K as latent image holders. The image formation units 1M, 1C, 1Y, and 1K are laid out at a predetermined pitch in a moving direction of the transfer paper so that rotation axis of the photosensitive drum within each photosensitive unit become parallel.

The laser printer further includes a light writing unit 2 and paper feeding cassettes 3 and 4, in addition to the image formation units 1M, 1C, 1Y, and 1K. The laser printer also includes a transfer unit 6 having a transfer paper conveyer belt 60 as a belt member that conveys the transfer paper toward a transfer section opposite to each photosensitive drum 11. The laser printer also includes a resist roller 5 consisting of a pair of rollers to supply the transfer paper to the transfer paper conveyer belt 60, a fixing unit 7 of a belt fixing system, and a paper catch tray 8 or the like. The laser printer also includes a manual feed tray, a toner replenishment container, a waste toner bottle, a two-sided inversion unit, and a power supply unit not shown respectively.

The light writing unit 2 includes a light source, a polygon mirror, an fθ lens, and a reflection mirror or the like, and emits a laser beam while scanning onto the surfaces of the photosensitive drums 11M, 11C, 11Y, and 11K based on image data.

A dashed line in FIG. 2 indicates a conveying route of the transfer paper. A conveying guide not shown guides the transfer paper supplied from the paper feeding cassettes 3 and 4, and the conveyer roller conveys the paper to a temporary stop position where the resist roller 5 is provided. The resist roller 5 supplies the transfer paper to the transfer paper conveyer belt 60 at a predetermined timing, and conveys the paper to pass through each transfer section opposite to each photosensitive drum 11. As a result, toner images on the respective photosensitive drums 11 formed by the image formation units 1M, 1C, 1Y, and 1K are sequentially transferred onto the transfer paper, thereby to form a color image on the transfer paper. The fixing unit 7 fixes a toner image on the transfer paper having the color image formed on it. The color image paper is discharged onto the paper catch tray 8.

Figure 3:
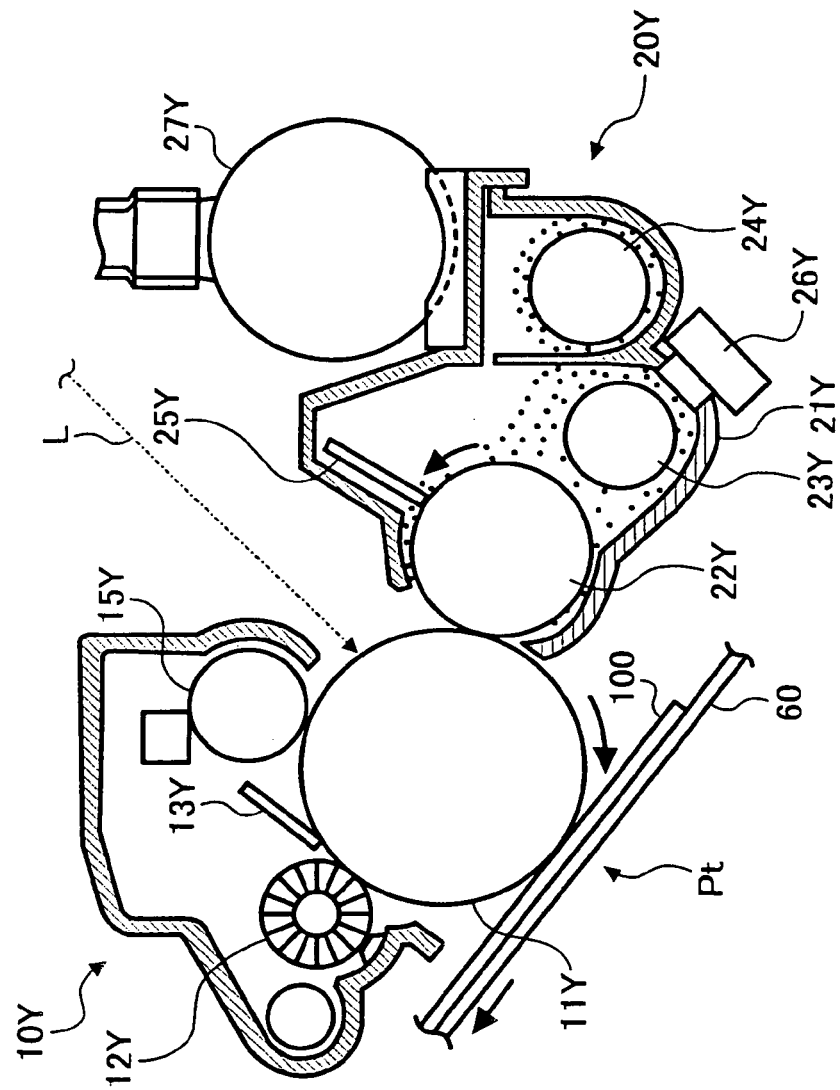
FIG. 3 is an enlarge view of an image formation unit of the laser printer.

FIG. 3 is an enlarged diagram illustrating a schematic of the yellow image formation unit 1Y among the image formation units 1M, 1C, 1Y, and 1K. Other image formation units 1M, 1C, and 1K also have similar configurations, and therefore, their explanation will be omitted.

In FIG. 3, the image formation unit 1Y includes the photosensitive unit 10Y and the developing unit 20Y as described above. The photosensitive unit 10Y includes a cleaning blade 13Y as a photosensitive cleaning unit that cleans the surface of the photosensitive drum, and a charge roller 15Y that uniformly charges the surface of the photosensitive drum, in addition to the photosensitive drum 11Y. The photosensitive unit 10Y also includes a lubricant coating and current removing brush roller 12Y having a function of coating a lubricant onto the surface of the photosensitive drum and uniformly removing the current from the surface of the photosensitive drum. A brush section of this lubricant coating and current removing brush roller 12Y consists of a conductive fiber. A core metal portion of this brush roller 12Y is connected with a current-removing power supply not shown to apply a current removing bias.

The charge roller 15Y applied with a voltage uniformly charges the surface of the photosensitive drum 11Y of the photosensitive unit 10Y having the above configuration. When the light writing unit 2 emits a modulated and deflected laser beam L while scanning onto the surface of the photosensitive drum 11Y, an electrostatic latent image is formed onto the surface of the photosensitive drum 11Y. The developing unit 20Y described later develops the electrostatic latent image on the photosensitive drum 11Y, thereby to form a yellow toner image. When a transfer paper 100 on the transfer paper conveyer belt 60 passes through a transfer section Pt, the transfer section Pt transfers the toner image from the photosensitive drum 11Y onto the transfer paper 100. The lubricant coating and current removing brush roller 12Y coats a predetermined quantity of lubricant onto the surface of the photosensitive drum 11Y after the transfer of the toner image, and removes the current from this surface. The cleaning blade 13Y cleans this surface to prepare for the next formation of an electrostatic image.

The developing unit 20Y uses a two-component developer containing a magnetic carrier and a negatively-charged toner as a developer that is used to develop the electrostatic image. The developing unit 20Y also includes a developing roller 22Y, conveying screws 23Y and 24Y, a developing doctor 25Y, a toner concentration sensor (T sensor) 26Y, and a powder pump 27Y or the like. The developing roller 22Y is a developer holder that is disposed to be partially exposed from the opening of the photosensitive drum of a developer case 21Y.

In FIG. 3, the conveying screws 23Y and 24Y stir and convey the developer that is accommodated in the developer case 21Y, thereby to frictionally charge the developer. A part of the developer is held on the surface of the developing roller 22Y. The developing doctor 25Y restricts the layer thickness of the developer. Then, the developer is conveyed to the developing position opposite to the photosensitive drum 11Y. At the developing position, the charging toner contained in the developer on the developing roller 22Y is used to develop the electrostatic latent image on the photosensitive drum 11Y. The toner concentration sensor 26Y detects the toner concentration of the developer in the developer case 21Y. The powder pump 27Y replenishes the toner when necessary.

Figure 4:
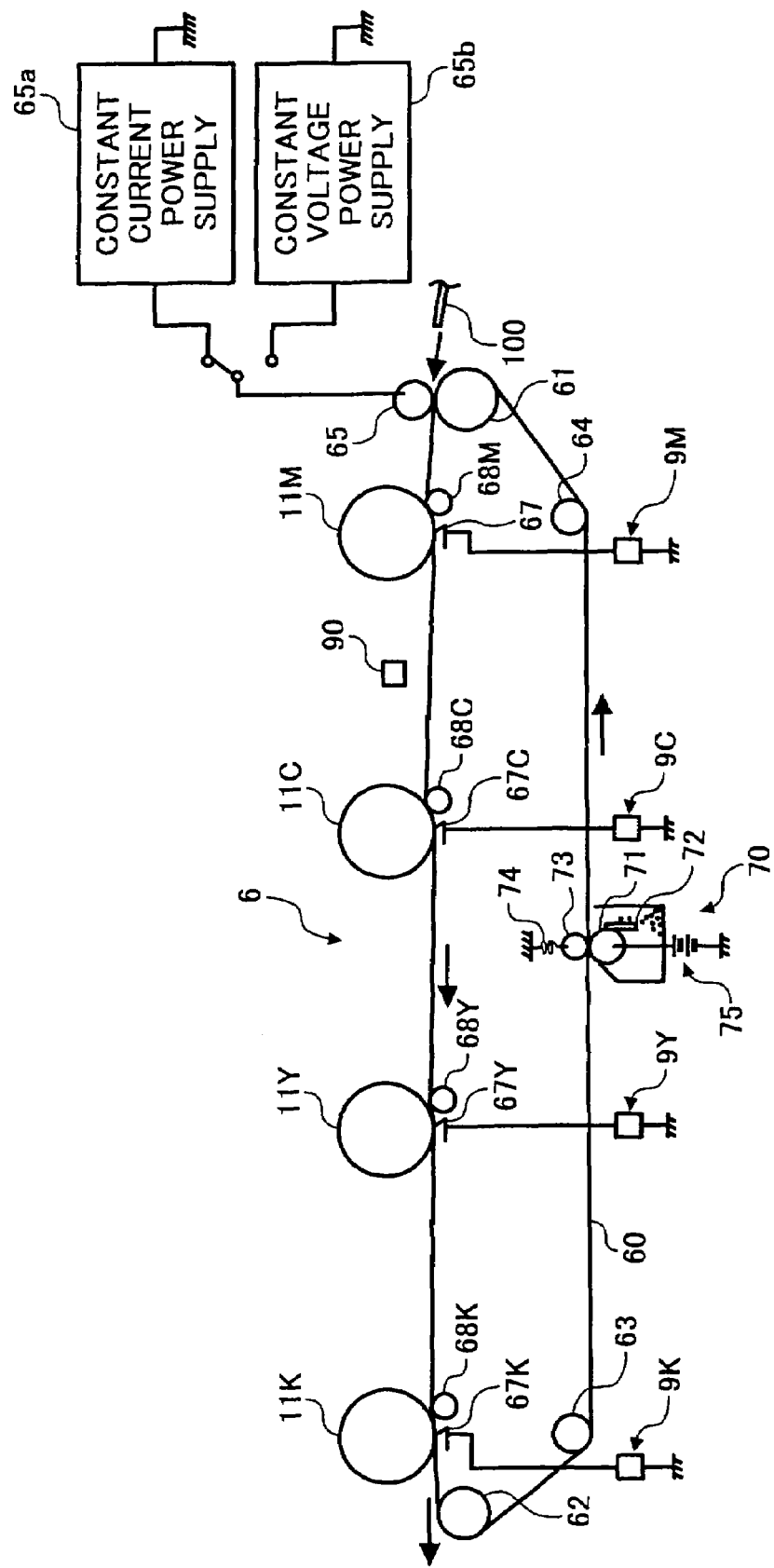
FIG. 4 is a schematic diagram of a transfer unit of the laser printer.

FIG. 4 is a schematic configuration diagram of the transfer unit 6. For example, polyvinilydene fluoride (PVDF) can be used for the material of the transfer paper conveyer belt 60 of the transfer unit 6. Four grounded supporting rollers 61, 62, 63, and 64 rotatably support the transfer paper conveyer belt 60.

The exit roller 62 at the downstream of the transfer paper moving direction frictionally drives the transfer paper conveyer belt 60, and is connected to a belt driving motor not shown. The exit roller 62 rotates the transfer paper conveyer belt 60 in a direction of an arrow mark, thereby to carry the transfer paper 100 in holding to each transfer section opposite to each of the photosensitive drums 11M, 11C, 11Y, and 11K of each image formation unit.

The transfer sections include transfer bias application members 67M, 67C, 67Y, and 67K as transfer electric field formation units that form a transfer electric field respectively. The transfer bias application members 67M, 67C, 67Y, and 67K have transfer nips to transfer toner images of respective colors opposite to the photosensitive drums 11M, 11C, 11Y, and 11K so as to be in contact with the back surface of the transfer paper conveyer belt 60. The transfer bias application members 67M, 67C, 67Y, and 67K that are used in the first embodiment are fixed brushes made of mylar. The transfer bias application members 67M, 67C, 67Y, and 67K apply a positive voltage having a polarity opposite to the toner charge polarity as a transfer bias from the transfer bias power supplies 9M, 9C, 9Y, and 9K. Based on the transfer bias applied via the transfer bias application members 67M, 67C, 67Y, and 67K, a transfer charge is given to the transfer paper conveyer belt 60. Each transfer section forms a transfer electric field having predetermined intensity to between each of the surface of the photosensitive drums 11M, 11C, 11Y, and 11K and the transfer paper conveyer belt 60.

The transfer unit 6 includes backup rollers 68M, 68C, 68Y, and 68K that press the transfer paper conveyer belt 60 against the photosensitive drums 11M, 11C, 11Y, and 11K respectively. At the upstream of each transfer section in the transfer paper moving direction, the transfer paper conveyer belt 60 is wound around a part of the peripheral surface of the transfer paper conveyer belt 11Y. With this arrangement, a contact pressure between the transfer paper 100 and each photosensitive drum at the transfer nip increases, and the transfer efficiency of each toner at each transfer section increases.

An electrostatic absorption roller 65 is provided at an opposite portion of the supporting roller 61 of the transfer unit 6, to be in contact with the transfer paper conveyer belt, as a transfer material absorbing electrode material. The electrostatic absorption roller 65 has a conductive foaming elastic layer formed on a core metal. For example, a chloroplain rubber having a resistibility of $10^5$ Ωcm can be used for the material of the elastic layer. A power supply 65a for the transfer paper absorption and a power supply 65b for an inverse polarity selectively apply a voltage as bias application units to the electrostatic absorption roller 65. The power supply 65a for the transfer paper absorption is a power supply of a constant current control system that applies a charge of a plus polarity opposite to the normal polarity of the toner. In the first embodiment, the current that flows to the supporting roller 61 is controlled to become plus 15 microamperes. The transfer paper passes through between the electrostatic absorption roller 65 and the supporting roller 61 in the state that power is supplied from the power supply 65a for the transfer paper absorption, and the transfer paper is electrostatically absorbed onto the transfer paper conveyer belt 60. The power supply 65b for an inverse polarity is a power supply of a voltage control system. The power supply 65b increases the toner charge that is charged in minus as the normal polarity on the transfer paper conveyer belt 60. The power supply 65b inverses the inverse polarity toner charged in plus to the minus polarity. The power supply 65b shifts the minus charged toner that is adhered to the surface of the electrostatic absorption roller 65 onto the surface of the transfer paper conveyer belt 60, thereby to clean the electrostatic absorption roller 65. In the first embodiment, a constant voltage of minus 2 kilovolts is applied to the electrostatic absorption roller 65. A body controller (not shown) switches over the voltage to be applied to the electrostatic absorption roller 65.

A bias cleaner 70 as a cleaning unit of a bias cleaning system that removes the toner adhered to the surface of the transfer paper conveyer belt 60 is disposed on the transfer unit 6 at a portion supported by the two supporting rollers 63 and 64 of the transfer paper conveyer belt 60. This bias cleaner 70 includes a conductive cleaning roller 71 disposed oppositely on the surface of the transfer paper conveyer belt 60, and a cleaning bias power supply 75. The cleaning bias power supply 75 is a cleaning bias application unit that forms a cleaning electric field by applying to the cleaning roller 71 a bias to move the charged toner of a negative-polarity to the cleaning roller 71 between the cleaning roller 71 and the transfer paper conveyer belt 60. The bias cleaner 70 also includes a removing blade 72 that removes a toner adhered to the cleaning roller 71 from the surface of the roller 71. The removing blade 72 is disposed to be brought into contact with the surface of the cleaning roller 71 in a contact width slightly larger than the width of the image region in the axial direction of the cleaning roller 71. A counter roller 73 that is biased by a spring 74 is provided at a position opposite to the cleaning roller 71 via the transfer paper conveyer belt 60.

A positional control of the transfer paper conveyer belt 60 as a characteristic of the present invention will be explained next.

Figure 5:
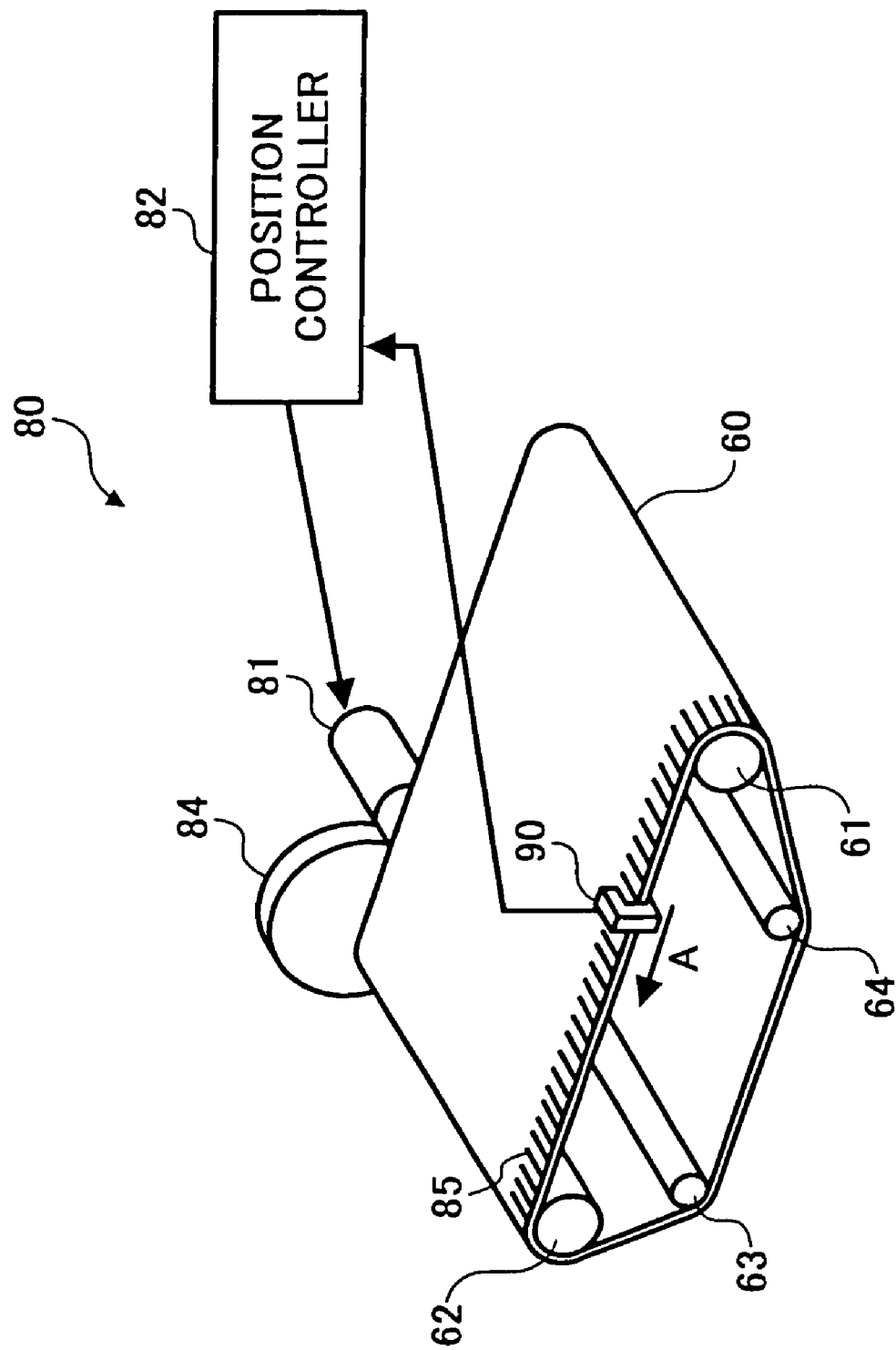
FIG. 5 is a schematic diagram of the belt drive unit that drives a transfer paper conveyer belt of the laser printer.

FIG. 5 is a schematic diagram of a belt drive unit 80 that drives the transfer paper conveyer belt 60 according to the first embodiment. This belt drive unit 80 includes a belt driving motor 81 as a driving force transmitter that generates driving force to drive the driving roller 62, and a position controller 82 that recognizes a moving position and controls a position. The position controller 82 and a mark sensor 90 described later constitutes this drive controller.

In the first embodiment, a stepping motor is used as the belt driving motor 81. The driving force from the belt driving motor 81 is transmitted to the driving roller 62 via a decelerator 84 that is provided coaxially at the outside of the driving roller 62. With this arrangement, the driving motor 62 rotates, and the transfer paper conveyer belt 60 moves to a direction of an arrow mark A based on friction.

A plurality of marks 85 consisting of through-holes are provided at the side of the transfer paper conveyer belt 60 in its moving direction such that the marks continue at a constant interval in the moving direction. The mark sensor 90 is provided as a mark detector opposite to an area through which the marks 85 pass along the move of the transfer paper conveyer belt 60. The mark sensor 90 outputs a mark detection signal as an output signal when a mark is detected. This mark detection signal is transmitted to the position controller 82 as a speed and position controller.

Figure 1:
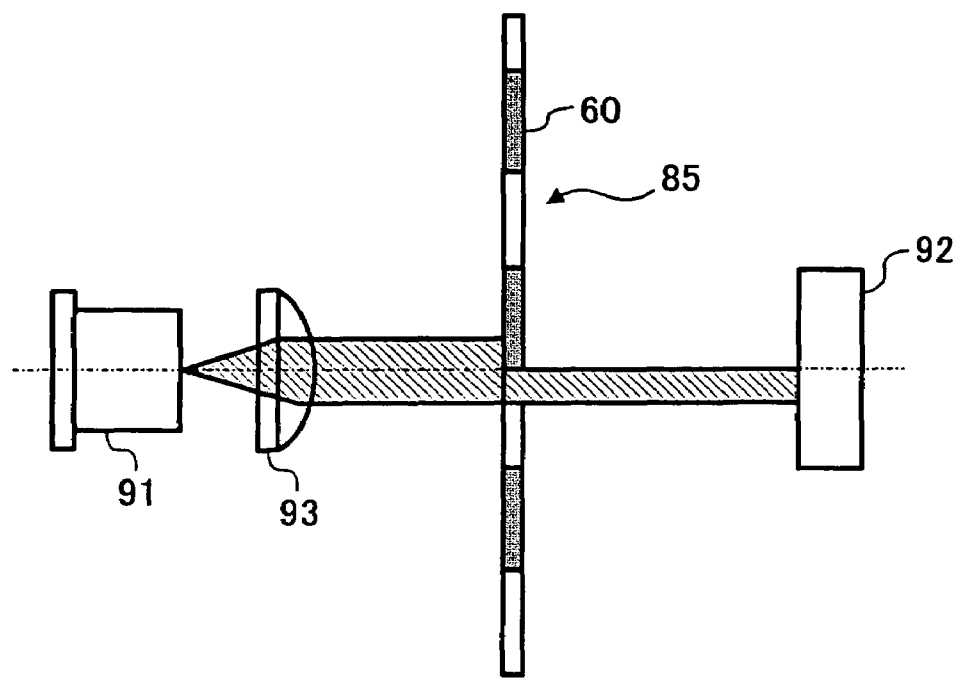
FIG. 1 is a schematic diagram of a mark sensor that is provided on a belt drive unit in a laser printer according to embodiments.
Figure 6A:
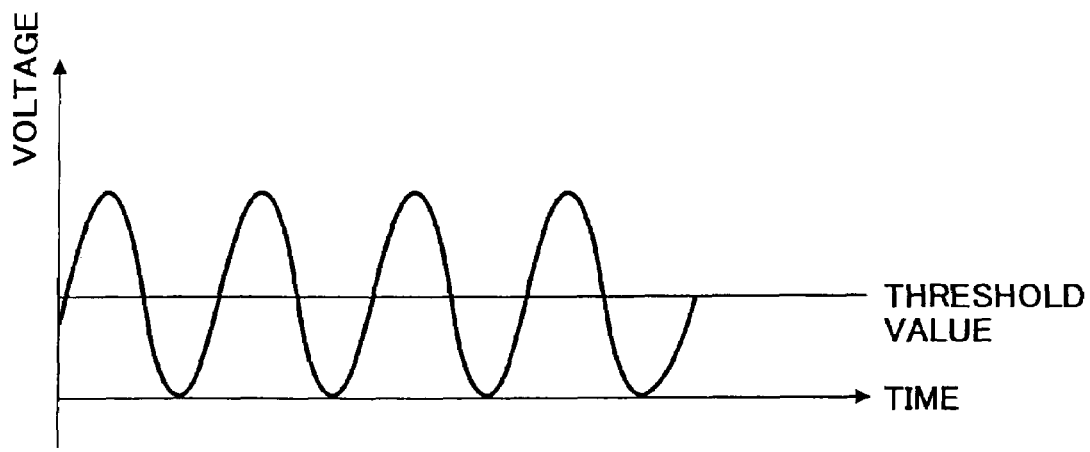
FIG. 6A is a graph illustrating a waveform of an output signal that is output from a photodiode of a mark sensor.
Figure 6B:
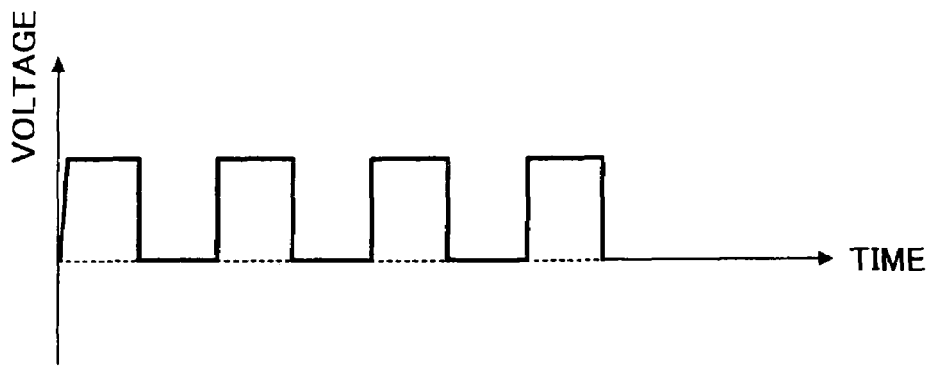
FIG. 6B is a graph illustrating a signal waveform that is pulsed at a threshold value shown in FIG. 6A.

FIG. 1 is a schematic diagram of the mark sensor 90. In the first embodiment, a transmission type optical sensor is used for the mark sensor 90 that detects the marks 85 on the transfer paper conveyer belt 60. The mark sensor 90 according to the first embodiment includes a light source 91 consisting of a light emitting diode (LED), and a photodiode 92 as a light receiver. A collimating lens 93 generates parallel light from the light emitted from the light source 91. A light emitter including the light source 91 and the collimating lens 93 emits the light onto the area through which the marks 85 on the transfer paper conveyer belt 60 pass. When the parallel light passes through the marks 85, the photodiode 92 receives the parallel light. Then, the photodiode 92 outputs an output signal as shown in FIG. 6A. This output signal is changed into a pulse as shown in FIG. 6B according to a threshold value shown in FIG. 6A. The mark sensor 90 outputs this pulse signal as a mark detection signal. The mark detector is not limited to the transmission type optical sensor that is used in the first embodiment, so long as the mark detector can detect the marks 85 provided on the transfer paper conveyer belt 60.

For example, when the marks 85 on the transfer paper conveyer belt 60 are formed in a reflection pattern, a reflection type optical sensor can be used. When the marks 85 are formed in a reflection pattern, an encoder scale can be utilized. A film case commercially available for a linear encoder has high resolution, and is available in mass production. Since the film case is obtained at a low price, marks can be formed at a constant interval on the transfer paper conveyer belt 60 at low cost.

In the first embodiment, a cross-sectional length of the light that passes through the collimating lens 93 on the transfer paper conveyer belt 60 in its moving direction is smaller than the interval between the marks 85. Therefore, the emitted light passes through one mark, and is then completely interrupted at a portion of the transfer paper conveyer belt 60. The next mark passes after that. Accordingly, there is a period when the photodiode 92 does not receive light at all between the marks. Consequently, it is possible to obtain a minimum value as a low level value (lower peak value) in the signal that is output from the photodiode. As a result, a difference between the high level value and the low level value can be maximized, and a stable mark detection can be carried out.

Figure 7A:
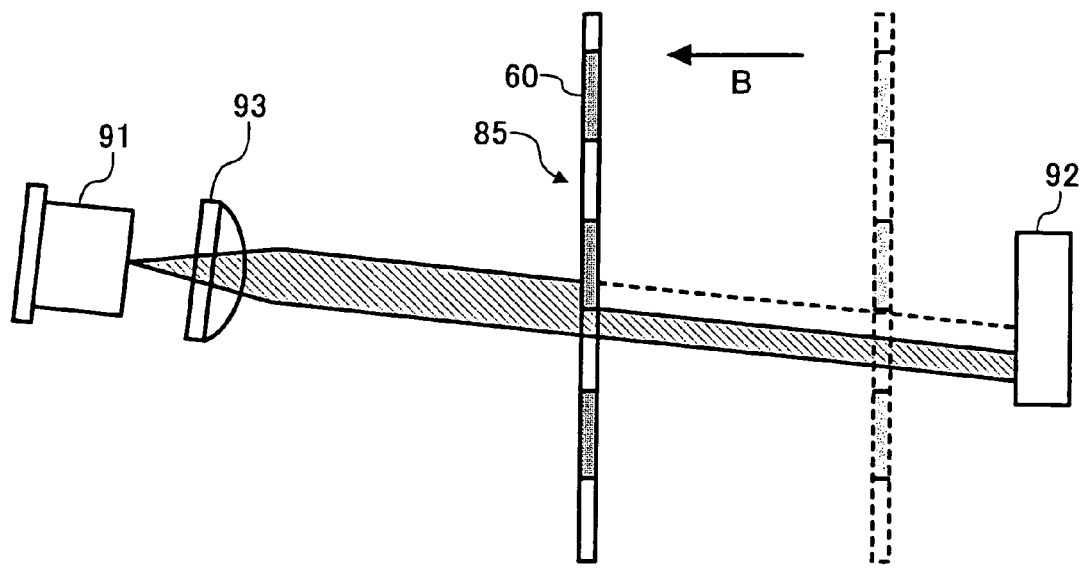
FIG. 7A is an explanatory diagram illustrating a change in a light path of the mark sensor following a displacement of the transfer paper conveyer belt when the light path is inclined from a direction perpendicular to a moving direction of the transfer paper conveyer belt to the moving direction.
Figure 7B:
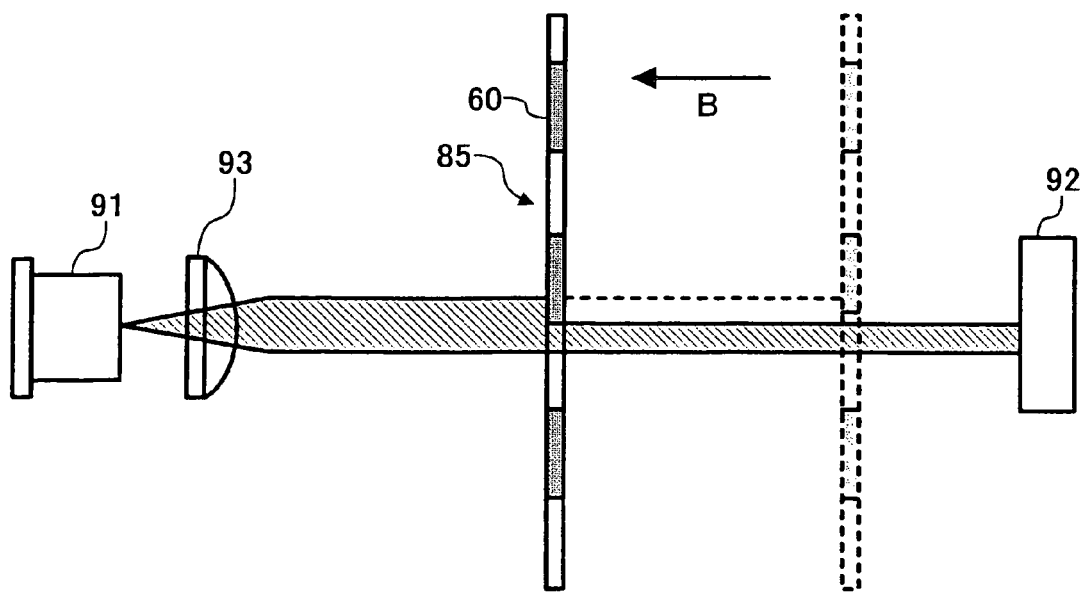
FIG. 7B is an explanatory diagram illustrating a change in a light path of the mark sensor following a displacement of the transfer paper conveyer belt when the light path is perpendicular to the moving direction.

In the first embodiment, as shown in FIG. 1, the light that passes through the collimating lens 93 is emitted from a direction perpendicular to the moving direction of the transfer paper conveyer belt 60. If the light path is inclined to the direction from the direction perpendicular to the moving direction of the transfer paper conveyer belt 60 as shown in FIG. 7A, the transfer paper conveyer belt 60 is displaced from a position of a dotted line in the FIG. 7A to a position of a solid line in the drawing. Therefore, the light reception starting timing of the photodiode 92 becomes late, and the light reception ending timing also becomes late. As a result, an accurate mark detection cannot be carried out. On the other hand, according to the first embodiment, the light path is perpendicular to the moving direction of the transfer paper conveyer belt 60 as shown in FIG. 7B. Therefore, the light reception starting timing and the light reception ending timing of the photodiode 92 make no change, even if the transfer paper conveyer belt 60 is displaced from a position of a dotted line to a position of a solid line in FIG. 7B.

In order to form the marks on the transfer paper conveyer belt 60, a resin tape is adhered to one side of the transfer paper conveyer belt 60 in its moving direction. This resin tape is a flexible material on which the marks 85 are continuously formed at a constant interval. In addition to this mark formation method, the marks can be formed simultaneously with the formation of the transfer paper conveyer belt 60. According to this method, the marks cannot be set at a constant interval when the contraction percentage of the belt as a whole is not uniform. However, according to an adherence method employed in the first embodiment, the marks can be set at a constant interval without affecting the mark intervals even if the contraction percentage of the transfer paper conveyer belt 60 is not uniform.

Figure 8:
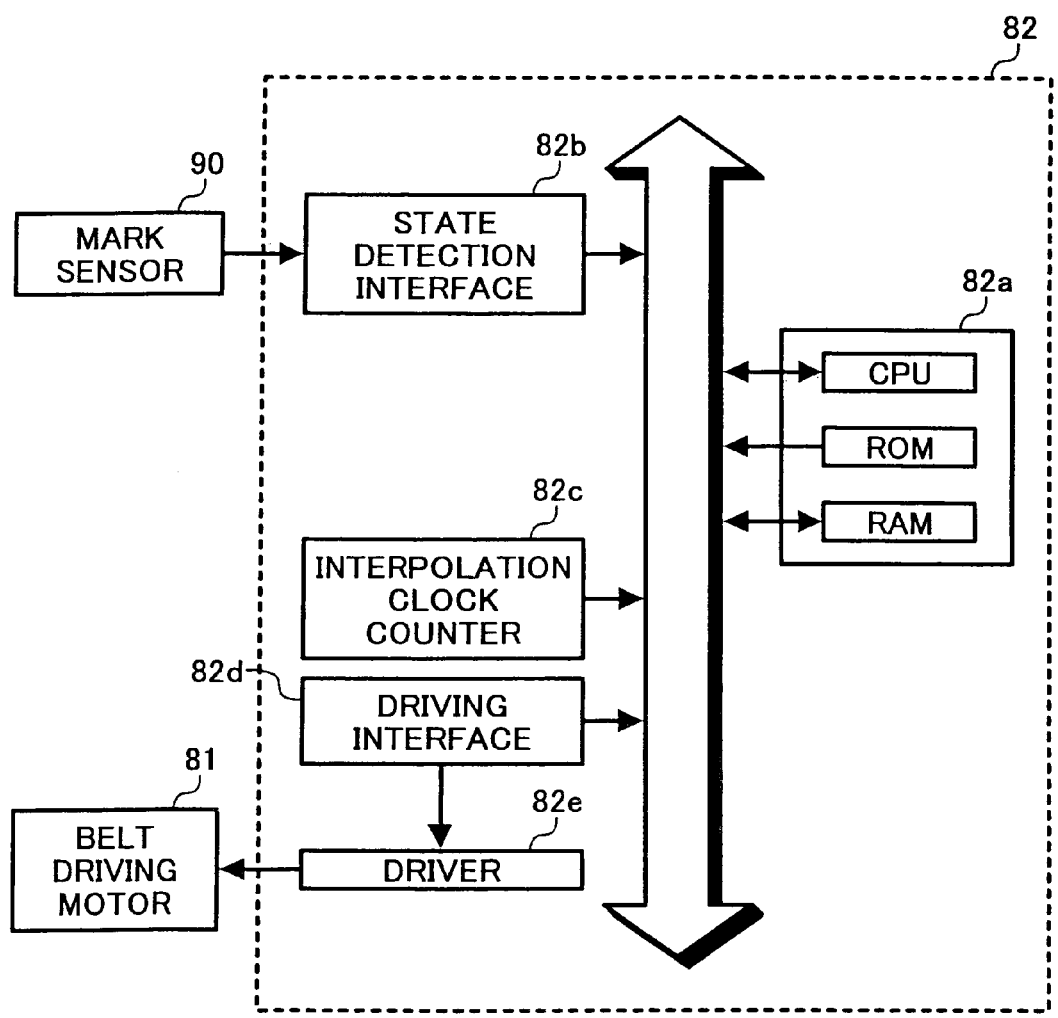
FIG. 8 is a functional block diagram of a position controller of the belt drive unit.

FIG. 8 is a functional block diagram of the position controller 82 according to the first embodiment.

The position controller 82 includes a microcomputer 82a that controls the whole of the controller. The microcomputer 82a has a microprocessor (CPU) as an operating unit, a read-only memory (ROM), and a random access memory (RAM) that are connected to each other via a bus. The position controller 82 also includes a status detection interface (I/F) 82b to receive a mark detection signal from the mark sensor 90. An output from the status detection interface 82b is input to the microcomputer 82a via the bus. The status detection interface 82b includes a counter not shown to count a number of pulses of the mark detection signal from the mark sensor 90. The mark detection signal is converted into a digital signal. The position controller 82 includes an interpolation clock counter 82c, which outputs the counted number of clocks to the microcomputer 82a via the bus.

In the first embodiment, the microcomputer 82a executes the position control of the belt drive unit 80. It is also possible to use a digital signal processor (DSP) having high calculation capacity instead of the microcomputer 82a.

The position controller 82 includes a driving interface 82d and a driver 82e that are connected to the belt driving motor 81. The driving interface 82d is connected to the microcomputer 82a via the bus. The driving interface 82d converts the digital signal that represents a calculation result of the microcomputer 82a into an analog signal, and gives this analog signal to the driver 82e. With this arrangement, the driver 82e controls a current and a voltage applied to the belt driving motor 81. As a result, the microcomputer 82a repeats the processing described later based on the mark detection signal, thereby to drive the transfer paper conveyer belt 60 so that the rotation position of the transfer paper conveyer belt 60 always follows a predetermined target position.

Figure 9:
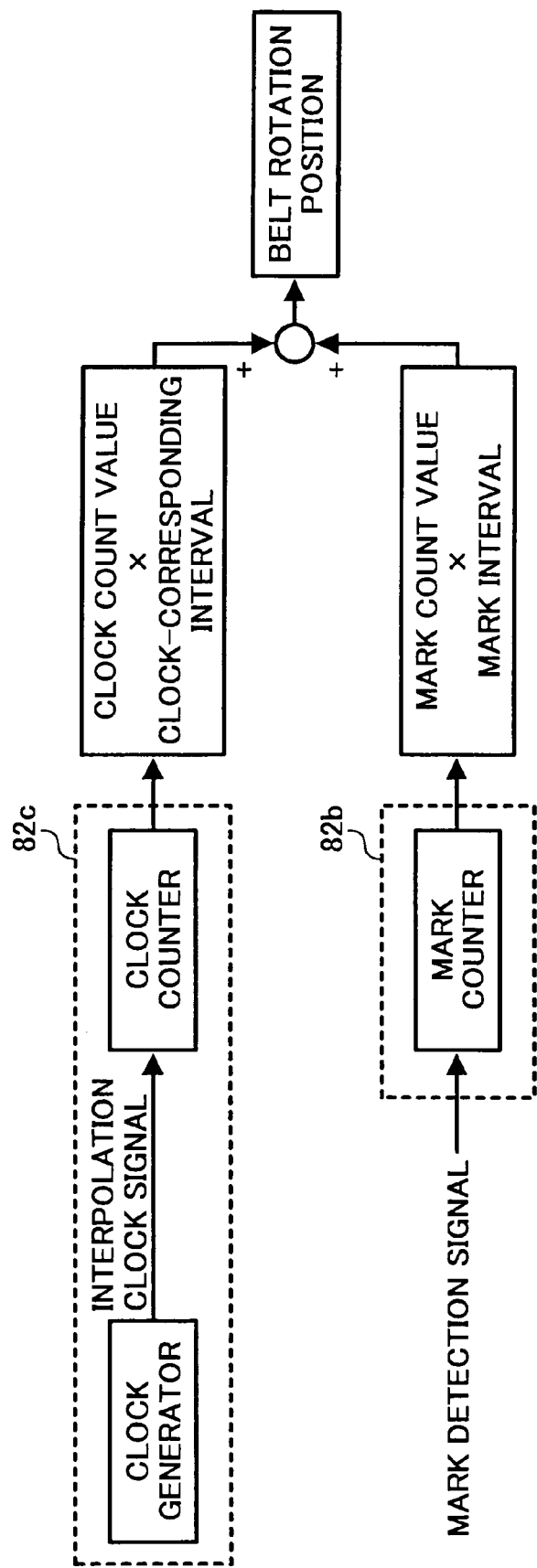
FIG. 9 is a block diagram indicating a control that the position controller carries out to understand an actual rotation position of the transfer paper conveyer belt.

FIG. 9 is a block diagram illustrating a control that the position controller 82 carries out to understand an actual rotation position of the transfer paper conveyer belt 60.

In the position controller 82, a mark counter provided in the state detection interface 82b counts the number of pulses of a mark detection signal from the mark sensor 90. In the position controller 82, a clock generation circuit as an interpolation clock generator that is provided in the interpolation clock counter 82c also generates a continuous interpolation clock signal.

A clock counter that is provided in the interpolation clock counter 82c counts the number of clocks of the interpolation clock signal. This clock counter is reset at a leading edge of a pulse that is generated when the mark counter counts the number of pulses. In other words, the clock counter is reset each time when a mark is detected.

The microcomputer 82a samples the mark count value obtained by the mark counter and the clock count value obtained by the clock counter at a predetermined sampling interval. The microcomputer 82a multiplies the mark interval on the transfer paper conveyer belt 60 to the mark count value. In the first embodiment, the mark interval is 169 micrometers. The microcomputer 82a also multiplies a clock-corresponding interval to the clock count value. The clock-corresponding interval indicates a moving distance of the transfer paper conveyer belt 60 corresponding to the clock time. In the first embodiment, the moving velocity of the transfer paper conveyer belt 60 is 200 mm/s, and the interpolation clock signal has 576 kilohertz. Therefore, this clock-corresponding interval becomes approximately 0.347 micrometers that is obtained from the following expression.

$$200[mm/s] \times (1/576\,[\text{kilohertz}]) = 3.4722 \times 10^{-7}\,[m]$$

The microcomputer 82a adds up the two calculated results. In other words, the mark counter counts the number of pulses each time when the transfer paper conveyer belt 60 moves by 169 micrometers. The clock counter counts clocks each time when the transfer paper conveyer belt 60 moves by 0.347 micrometers during the period while the transfer paper conveyer belt 60 moves by 169 micrometers. Therefore, the sum indicates the actual detailed rotation position of the transfer paper conveyer belt 60. Accordingly, the microcomputer 82a can accurately understand the actual detailed rotation position (moving position) of the transfer paper conveyer belt 60 at each sampling time.

As explained above, the microcomputer 82a that acquires the actual rotation position of the transfer paper conveyer belt 60 compares the actual rotation position with the target rotation speed at the sampling time (hereinafter, "target position"). Specifically, the microcomputer 82a calculates a difference between the actual rotation position and the target position, and outputs the calculation result to the driving interface 82d. The driving interface 82d outputs the current and voltage that make the difference zero to the belt driving motor 81 via the driver 82e. As a result, the rotation position of the transfer paper conveyer belt 60 is controlled to be always the target position.

A modification of the mark sensor according to the first embodiment (hereinafter, "first modification") will be explained next.

The transfer paper conveyer belt 60 may meander because of a deviation in the parallelism between axes of the supporting roller 61, 62, 63, and 64 that support the transfer paper conveyer belt 60. When the meandering occurs, the position in the width direction of the transfer paper conveyer belt 60 is deviated. As a result, the moving route of the marks 85 following the transfer paper conveyer belt 60 is deviated from the light path of the mark sensor, which has a risk of making it impossible to accurately detect the marks. For example, when the cross-sectional shape of the light that the mark sensors utilize is round and also when the shape of the mark 85 has the same size as that of the cross-sectional shape of the light, the marks cannot be detected when the position of the transfer paper conveyer belt 60 in its width direction is deviated by only one mark. Therefore, in the first modification, a stable mark detection can be achieved even when the transfer paper conveyer belt 60 meanders.

Figure 10:
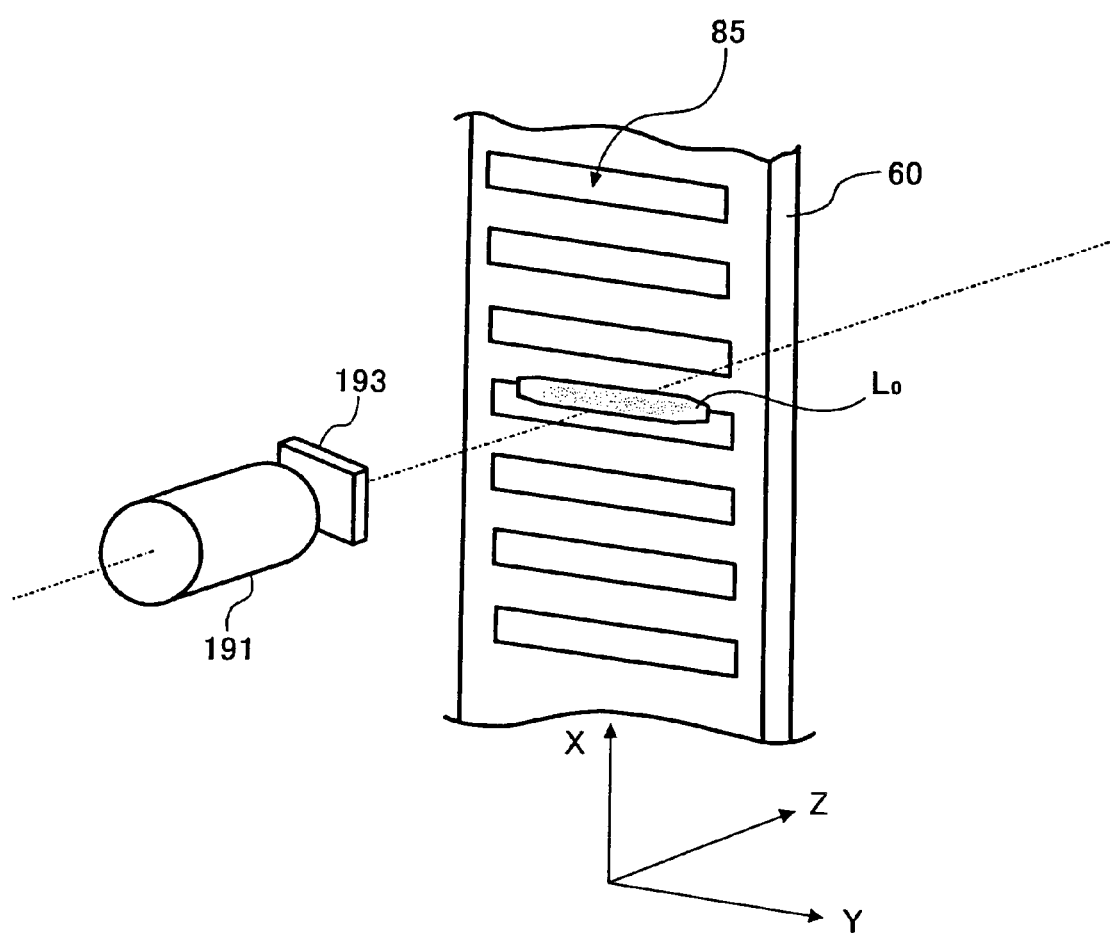
FIG. 10 is an explanatory diagram illustrating a state that the light from a light source is emitted onto a mark on the transfer paper conveyer belt according to a first modification.

FIG. 10 is an explanatory diagram illustrating a state that the light from the light source 191 is emitted onto the mark 85 of the transfer paper conveyer belt 60 according to the first modification. As shown in FIG. 10, the marks 85 on the transfer paper conveyer belt 60 have a long shape in a direction perpendicular to the moving direction of the belt. The light source 191 of the mark sensor in the first embodiment emits light having a long cross-sectional shape in the direction (the Y direction in the drawing) that is perpendicular to the moving direction (the X direction in the drawing) of the transfer paper conveyer belt 60. The collimating lens 193 makes this light parallel, and emits the light onto the area through which the marks 85 on the transfer paper conveyer belt 60 pass, in a similar manner to that in the first embodiment. When this light is emitted onto the marks 85, the portion where the area L0 emitted with the light and the moving route of the marks 85 are superimposed with each other becomes large. Even when the transfer paper conveyer belt 60 meanders to make the belt deviate in its width direction, the marks can be detected so long as the superimposed portion is present. According to the first modification, the length of each mark in the belt width direction and the cross-sectional length of the light are set to be always in superimposition of the area L0 emitted with the light and the moving route of the marks 85, within a range in which the transfer paper conveyer belt 60 can move in its width direction during the meandering. Therefore, according to the first embodiment, the marks can be detected stably even when the transfer paper conveyer belt 60 meanders.

Another modification of the mark sensor according to the first embodiment (hereinafter, "second modification") will be explained next.

The transfer paper conveyer belt 60 having the marks 85 is disposed inside the laser printer, and scattered toner is adhered to the printer. When the scattered toner is adhered to the area where the marks 85 are provided, the quantity of the light that passes through the marks decreases or the light cannot pass through the area. In this case, the detection of the marks becomes unstable, or the marks cannot be detected. Usually, even if the scattered toner is adhered to the printer, the bias cleaner 70 cleans the stained portion. However, when the toner is fixed or when the marks 85 are deformed by the bias cleaner 70, it is not possible to carry out a stable detection of the marks. Therefore, in the second modification, even when a part of the marks 85 is stained with the scattered toner to make it difficult to detect the marks, the configuration of this modification makes it possible to detect the marks stably.

Figure 11:
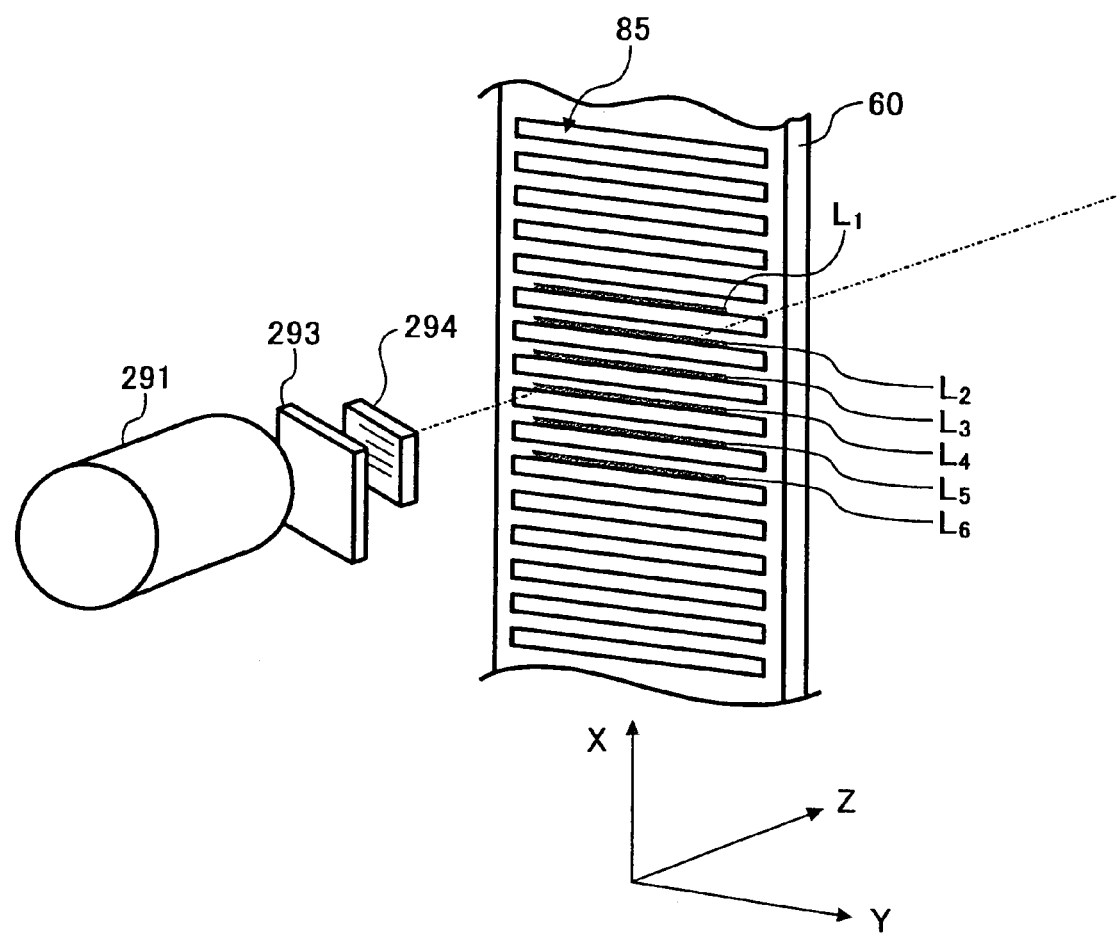
FIG. 11 is an explanatory diagram illustrating a state that the light from a light source is emitted onto a mark on the transfer paper conveyer belt according to a second modification.

FIG. 11 is an explanatory diagram illustrating a state that the light from a light source 291 is emitted onto the mark 85 on the transfer paper conveyer belt 60 according to the second modification. A collimating lens 293 makes parallel the light emitted from the light source 291 of the mark sensor, in a similar manner to that in the first embodiment. In the second modification, the light that passes through the collimating lens 293 is divided into six beams in the moving direction of the transfer paper conveyer belt 60 (the X direction in the drawing), with a slit string 294. The six beams obtained by dividing the light are emitted onto the area through which the marks 85 on the transfer paper conveyer belt 60 pass. The six beams emitted onto the transfer paper conveyer belt 60 have their length in the belt moving direction (the X direction in the drawing) equal to the length of each mark 85. The interval between the beams is equal to the interval between the marks. Therefore, the photodiode starts receiving the emitted six beams that pass through the marks, at the same time. The photodiode ends receiving the emitted six beams at the same time, when the beams are interrupted by the belt. A light receiver that receives each of the six beams may be provided independently. In the second modification, a single photodiode 92 is utilized like in the first embodiment. In the second modification, a condensing lens not shown condenses the beams that pass through the six marks 85, and the single photodiode 92 receives this light.

According to the second modification, even when there is a cause to make it difficult to detect a part of the six marks 85 through which the divided beams pass, it is possible to detect the marks based on the rest of the beams that pass through the marks.

In the second modification, an output signal is used when a plurality of beams pass through a plurality of marks at the same time. Therefore, it is possible to average pitch errors that occur in the plurality of marks which are provided at a constant interval. Accordingly, there is an effect that the marks can be detected in higher precision.

In order to emit a plurality of beams, a plurality of light sources may be used, or a diffraction grating may be used to divide the light into beams, and alternatively, any method can be used.

A still another modification of the mark sensor according to the first embodiment (hereinafter, "third modification") will be explained.

Figure 12:
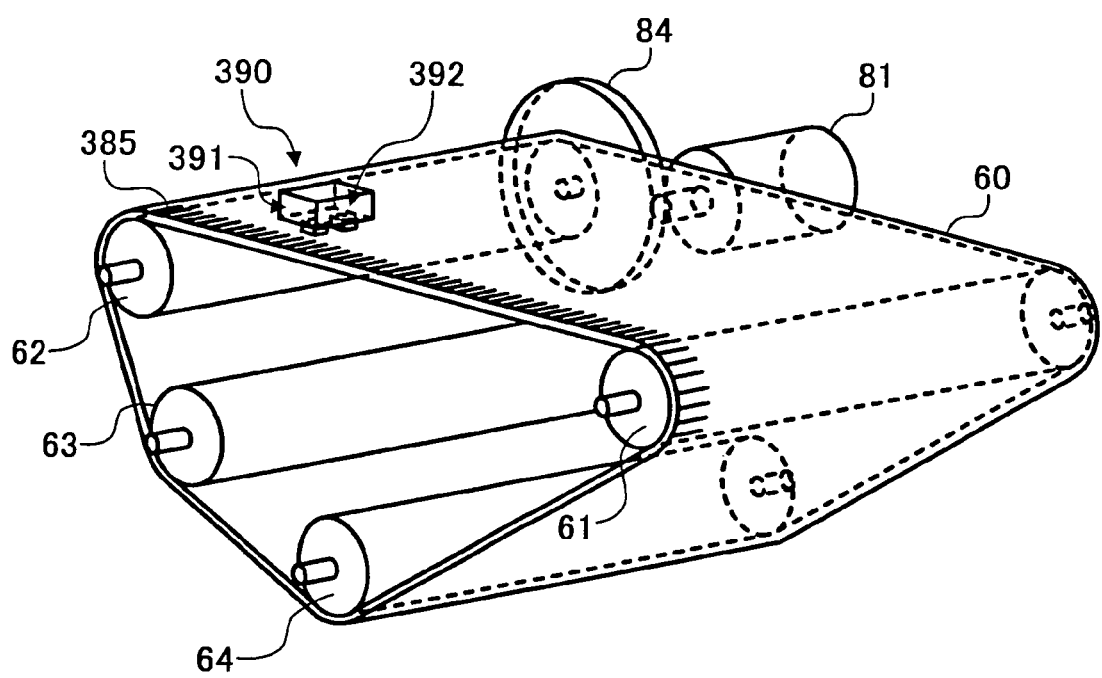
FIG. 12 is a schematic diagram of a belt drive unit that drives the transfer paper conveyer belt according to a third modification.
Figure 13:
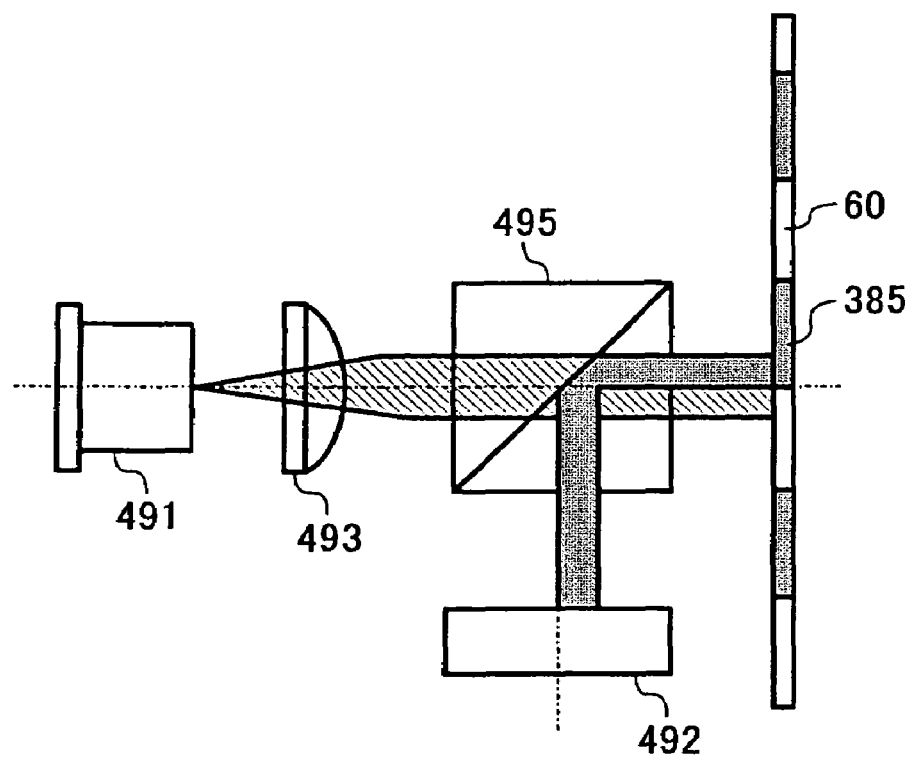
FIG. 13 is a schematic diagram illustrating another modification of the mark sensor of the belt drive unit.

FIG. 12 is a schematic diagram of a belt drive unit 380 that drives the transfer paper conveyer belt 60 according to the third modification. The mark sensor 390 that is provided on this belt drive unit 380 is a reflection type mark sensor. Marks 385 provided on the transfer paper conveyer belt 60 are configured in a reflection pattern. The mark sensor 390 consists of a light source 391 using an LED, a collimating lens 393 that makes this light into a parallel beam, and a photodiode 392, like in the first embodiment. As the mark sensor is a reflection type, the photodiode 392 is disposed at the same side as the light source 91 on the transfer paper conveyer belt 60.

In the third modification, a string of the light source 391 and the photodiode 392 is disposed in parallel with the surface of the transfer paper conveyer belt 60 along the direction that is perpendicular to the moving direction of the transfer paper conveyer belt 60. Therefore, the light that is emitted from the light source 391 and that passes through the collimating lens 393, and the light that is reflected from the mark 385 are in the direction perpendicular to the moving direction of the transfer paper conveyer belt 60. With this arrangement, even when the distance between the mark sensor 90 and the transfer paper conveyer belt 60 changes, there is no change in the light reception starting time and the light reception ending time of the photodiode 392, for the same reason as that explained with reference to FIG. 7A and FIG. 7B. As a result, it is possible to detect the marks accurately.

In the third modification, the reflection type mark sensor is used that has the light transmitter and the light receiver in separate structures. However, it is also possible to use a reflection type mark sensor that has an integrated structure of the light transmitter and the light receiver. In this case, the reflection type mark sensor can emitted the light from the normal direction of the surface of the transfer paper conveyer belt 60, like in the first embodiment.

Even when the light emitter and the light receiver have separate structures, it is possible to emit light from the normal direction of the surface of the transfer paper conveyer belt 60, like in the first embodiment. Specifically, as shown in FIG.

13, the light that passes through a collimating lens 493 is emitted onto the transfer paper conveyer belt 60 via a splitter 495 from the normal line direction. The splitter 495 diffracts the reflection light that is reflected perpendicularly by the mark 385, by 90 degrees. This light is guided to a photodiode 492 that is disposed at the side of the belt moving direction of the splitter 495.

In the configurations of the first embodiment, the first modification, the second modification, and the third modification, the cross-sectional length of the light in the belt width direction that is emitted onto the area through which the marks 85 and 385 on the transfer paper conveyer belt 60 pass is shorter than the length of the marks 85 and 385 in the same direction respectively. With this arrangement, even if the belt meanders to some extent, all the beams can pass through the marks 85 in the belt width direction. Therefore, there is no variation in the quantity of the light that the photodiode receives. There is no variation in the output signal either. Therefore, even if some meandering occurs in the belt, the marks can be detected stably, and the position control can be carried out stably.

The belt drive unit 80 provided in the laser printer according to the above embodiment has the drive control device including the light sources 91, 191, 391, and 491, and the collimating lenses 93, 193, 393, and 493. The light sources 91, 191, 391, and 491 emit light onto the marks 85 and 385 that are provided on the transfer paper conveyer belt 60 that continue at a predetermined interval in the moving direction of the transfer paper conveyer belt 60 as the belt transferring member. The light emitting unit according to the second modification includes the slit string 294 in addition to the light source 291 and the collimating lens 293. These drive control devices include the photodiodes 92, 392, and 492 as the light receivers to receive the transmission light emitted from the light sources onto the marks or the reflection light. Each drive control device also includes the position controller as a speed and position controller to control the speed and the position of the transfer paper conveyer belt 60 based on the signal output from the photodiode. The light that is output from the collimating lenses 93, 193, 393, and 493 or the slit string 294 becomes approximately a parallel light. Therefore, even when the position of the surface of the transfer paper conveyer belt 60 in its normal line direction is displaced and the detection distance changes at each timing of detecting the mark, the photodiode makes substantially no change in the reception starting timing and the reception ending timing of the light that passes through or is reflected from one mark. As a result, it becomes possible to restrict the detection error that occurs due to the deviation in the detection distance.

In the printer according to the first embodiment, the light that is emitted from the collimating lenses 93, 193, 393, and 493 or the slit string 294 has a smaller cross-sectional length in the moving direction of the transfer paper conveyer belt 60 than the interval between the marks 85 and 385 respectively. Therefore, as explained in the first embodiment, it is possible to maximize the difference between the high level value and the low level value of the output signal from the photodiodes 92, 392, and 492 respectively. Consequently, the marks can be detected stably.

In the first modification, the light that has a long cross-sectional shape in the direction (the Y direction in the drawing) perpendicular to the moving direction (the X direction in the drawing) of the transfer paper conveyer belt 60 is emitted onto the marks 85 of the transfer paper conveyer belt 60. As explained in the first modification, a stable mark detection can be carried out even when the transfer paper conveyer belt 60 meanders.

In the second modification, the slit string 294 is used to emit a plurality of beams onto the marks 85 along the moving direction of the transfer paper conveyer belt 60. The light irradiation interval is an integer times the interval between the marks 85 that are continuously provided at a constant interval on the transfer paper conveyer belt 60. With this arrangement, as explained in the second modification, even when there is a cause to make it difficult to detect a part of the six marks 85 through which the plurality of beams pass, it is possible to detect the marks based on the rest of the beams that pass through the marks. Further, as explained in the second modification, pitch errors that occur in the marks 85 provided at a constant interval can be averaged, and the marks can be detected in high precision.

In the first embodiment, the light that is output from the collimating lenses 93, 193, 393, and 493 or the slit string 294 is emitted from the direction that is perpendicular to the moving direction of the transfer paper conveyer belt 60. Therefore, as explained in the first embodiment, the light reception starting timing and the light reception ending timing of the photodiodes 92, 392, and 492 make no change, even if the surface of the transfer paper conveyer belt 60 in its normal line direction is displaced. As a result, the conventional detection error that occurs due to the deviation in the detection distance can be restricted.

Except the configuration shown in FIG. 12, in the first embodiment, light is emitted from the normal line direction of the surface of the transfer paper conveyer belt 60. As a result, the conventional detection error that occurs due to the displacement of the position of the surface of the transfer paper conveyer belt 60 in its normal direction can be restricted.

The laser printer according to the first embodiment includes the transfer paper conveyer belt 60 having the marks 85 and 385 that continue at a predetermined interval in the moving direction. The laser printer also includes the belt drive unit 80 as the driving force transmitter that transmits the driving force to move the transfer paper conveyer belt 60 to this transfer paper conveyer belt 60. The laser printer also includes the drive control device having the above configuration as the drive controller to control the driving of the belt drive unit 80. As a result, the conventional detection error that occurs due to the deviation in the detection distance can be restricted. Image quality can also be maintained even when the detection distance varies.

In the above embodiment, the drive control of the transfer paper conveyer belt 60 is explained as an example. The invention can also be applied similarly to a device that controls the position or the speed of the belt member. For example, the invention can also be applied to control the driving of the belt member such as the photosensitive belt and the intermediate transfer belt.

Figure 14:
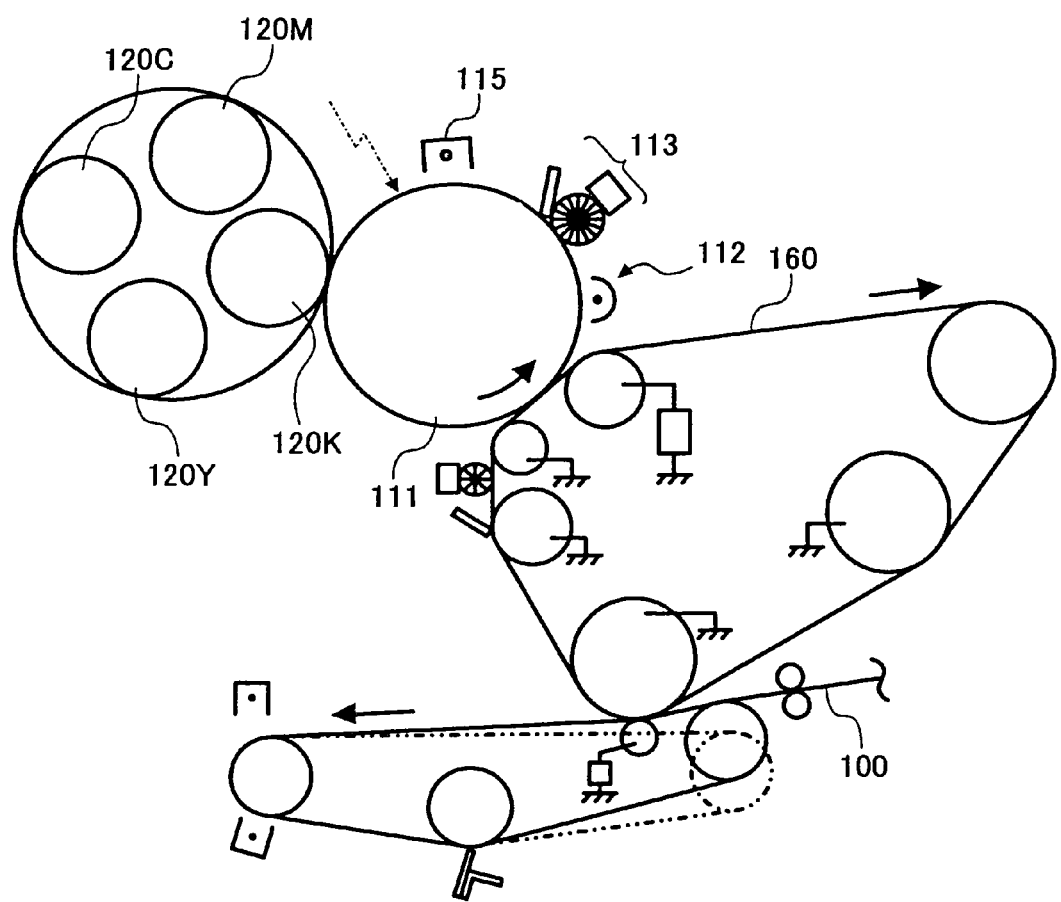
FIG. 14 is an explanatory diagram illustrating one example of a one-drum type image forming apparatus.

In the first embodiment, the drive control of the transfer paper conveyer belt 60 in what is called the tandem type color printer is explained. The invention can also be applied to a position control of a intermediate transfer belt 160 for an image forming apparatus shown in FIG. 14 having a plurality of color developing devices 120K, 120Y, 120C, and 120M around one photosensitive drum 111. This apparatus obtains a color image by transferring each color toner image sequentially formed on the photosensitive drum 111 onto the intermediate transfer belt 160 by sequentially superimposing the images. This one-drum type image forming apparatus has one photosensitive drum 111. Therefore, this apparatus has an advantage that it can be provided in a relatively compact size at a low cost.

However, this image forming apparatus has a disadvantage in that as the one photosensitive drum 111 is used to form a color image by repeating the image formation by a plurality of times (usually four times), the image cannot be formed at a high speed. On the other hand, the tandem type image forming apparatus according to the first embodiment includes the photosensitive drums 11K, 11Y, 11C, and 11M, and therefore, this apparatus cannot be easily provided in compact, which has a drawback in high cost. This apparatus, however, has an advantage in that the image can be formed easily at a high speed. Recently, a color image forming apparatus is also strongly required to form an image at a high speed like a monochromatic image forming apparatus. Therefore, the tandem type image forming apparatus according to the first embodiment calls high attention.

Figure 15:
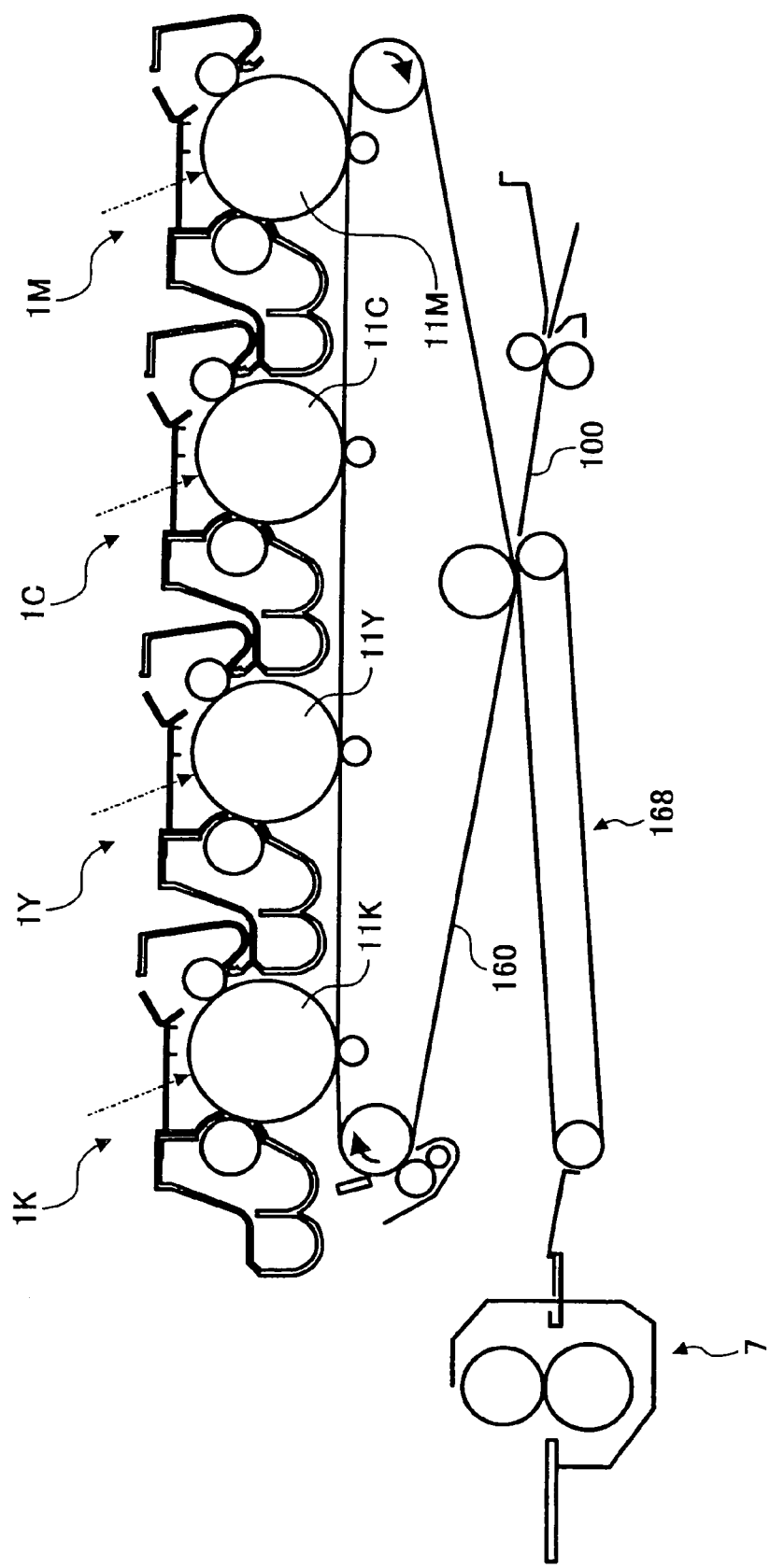
FIG. 15 is an explanatory diagram of a tandem type image forming apparatus that employs an indirect transfer system.

The tandem type image forming apparatus has a direct transfer system that directly transfers a toner image on each photosensitive unit 1 explained in the first embodiment onto the transfer paper 100, and an indirect transfer system as shown in FIG. 15. According to this indirect transfer system, the toner image on each photosensitive drum 11 is temporarily sequentially transferred onto the intermediate transfer belt 160 as the intermediate transfer unit. A secondary transfer device 168 collectively transfers the toner images on the intermediate transfer belt 160 onto the transfer paper 100. The present invention can also be applied to the drive control of the intermediate transfer belt 160 in the image forming apparatus of the indirect transfer system. In the example shown in FIG. 15, the secondary transfer device 168 is a transfer paper conveyer belt. This transfer paper conveyer belt may have a roller shape.

These two types of transfer systems are compared as follows. According to the direct transfer system, a paper feeder needs to be disposed at the upstream of the transfer paper conveying direction where the photosensitive drums 11 are arranged. The fixing unit 7 must be disposed at the downstream. Therefore, this direct transfer system has a drawback in that the apparatus becomes large in the transfer paper conveying direction. On the other hand, according to the indirect transfer system, a secondary transfer position can be disposed relatively easily. Therefore, the paper feeder and the fixing unit 7 can be disposed within an area projected from the direction (the upward direction in the drawing) perpendicular to the layout direction of each image formation unit 1. This has an advantage in that the apparatus can be in compact. According to the direct transfer system, in order to avoid the increase in the size of the apparatus in the transfer paper conveying direction, the fixing unit 7 is often disposed close to an image formation unit 1K that is positioned at the downstream of the transfer paper conveying direction. In this case, the fixing unit 7 cannot have sufficient room to loosen the transfer paper 100. Therefore, the impact of the front end of the transfer paper 100 proceeding into the fixing unit 7 badly affects the image formation carried out by the image formation unit 1. This bad influence becomes extreme particularly when the transfer paper 100 is a sheet having a large thickness. A speed difference between the speed when the sheet is conveyed through the fixing unit 7 and the speed when the transfer paper conveyer belt 60 conveys the sheet badly affects the image formation carried out by the image formation unit 1. On the other hand, according to the indirect transfer system, the fixing unit 7 can be disposed with sufficient room to provide the transfer paper 100 with a loosening. Therefore, the fixing unit 7 gives substantially no influence to the image formation carried out by the image formation unit 1. From this viewpoint, among the tandem type image forming apparatus, the indirect transfer system is particularly excellent.

It is needless to mention that the present invention can be applied to the belt member such as the photosensitive belt that is provided not only in the color image forming apparatus but also the monochromatic image forming apparatus.

The present invention can be applied not only to the belt member for image formation but also to the belt member for a usage that requires high-precision control of a moving quantity per unit time or a moving position at a predetermined time.

A second embodiment will be explained next. An encoder according to the second embodiment emits light from a light source onto a scale having a portion of a predetermined reflectance or transmission factor arrayed in a one-dimensional lattice via a slit member having an aperture of an aperture width approximately equal to a lattice width of the scale. A light receiver detects light intensity of the light reflected from the scale or the light transmitted through the scale. The encoder detects a displacement of the scale relative to the slit member based on a change in the light intensity detected by the light receiver.

Figure 16A:
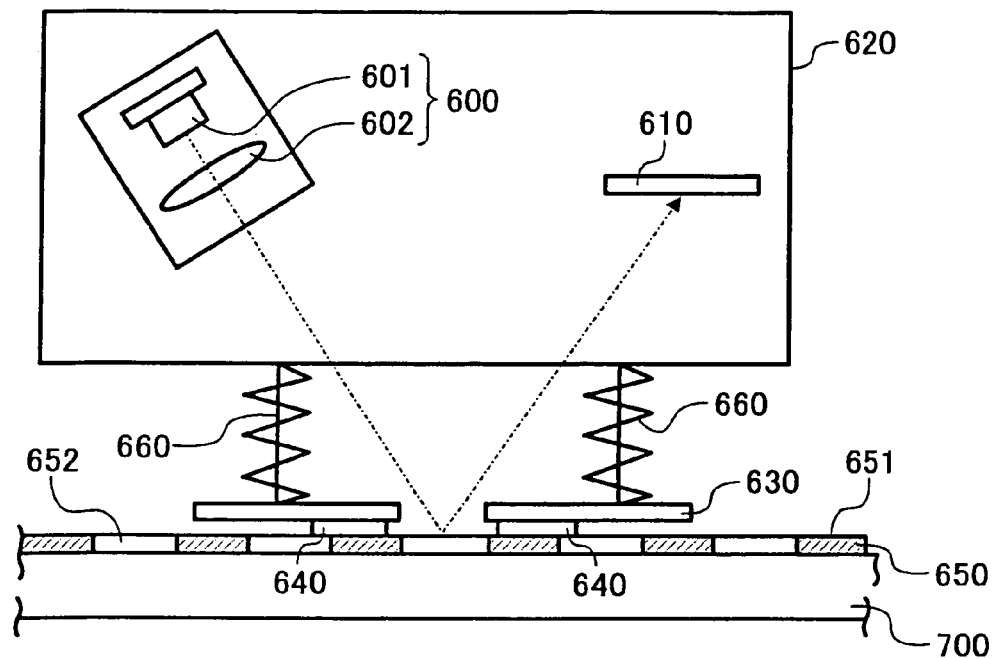
FIGS. 16A to 16C are explanatory diagrams illustrating a first example of the encoder.

In FIG. 16A, a light source section 600 has a light source 601, and a lens 602 that condenses the light from the light source 601. The lens 602 is a collimating lens. A light receiver 610 is accommodated within a sensor casing 620 together with the light source section 600. A shifter 700 is the intermediate transfer belt, on which a scale 650 is formed.

A slit member 630 is disposed with a predetermined interval from the scale 650 via a gap holding member 640. A pressing unit 660 provided between the sensor casing 620 and the slit member 630 elastically presses the slit member 630 against the shifter 700. Therefore, the gap holding member 646 always holds the gap between the slit member 630 and the scale 650 to have a thickness of the gap holding member 640.

Figure 16B:
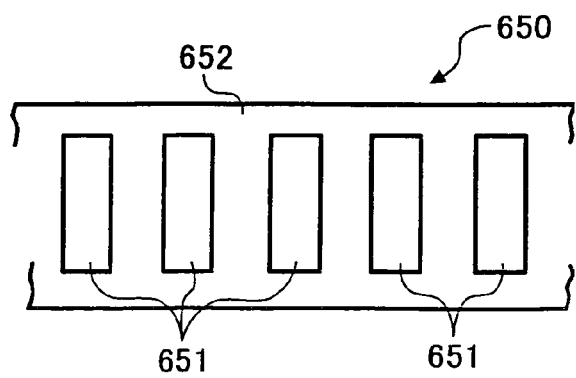

As shown in FIG. 16B, in the scale 650, rectangular non-reflection sections 651 are arrayed in one-dimensional direction in the left and right direction in the drawing. Portions other than the non-reflection sections 651 are reflection sections 652. The non-reflection sections 651 can be formed as light transmission sections or as light absorbing sections. A width of each non-reflection section 651 in the one-dimensional array (the lateral direction in the drawing) is equal to a width of the reflection section 652.

Figure 16C:
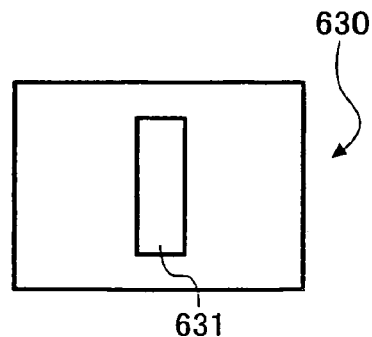

The slit member 630 is a rectangular light-shielding plate, and has a rectangular aperture 631, as shown in FIG. 16C. The aperture 631 of course transmits light, and may be formed with a transparent material or may be formed as a hole. The shape and the size of the aperture 631 are the same as those of the non-reflection section 651 of the scale 650.

When the light source 601 of the light source section 600 is turned on, a lens 602 condenses the light from the light source 601 and parallel pencils the light, thereby to emit the slit member 630. A part of the irradiation light is transmitted through the aperture 631 of the slit member 630, and emits the scale 650 via the gap held by the gap holding member 640. When the light emits the reflection section 652 of the scale 650, the reflection light passes through the aperture 631 of the slit member 630, and is incident to the light receiver 610. The light receiver 610 photo-electrically converts the light.

When the shifter 700 is displaced in the lateral direction in FIG. 516A, the portion of the scale 650 emitted via the aperture 631 of the slit member 630 alternately changes between the reflection section 652 and the non-reflection section 651. Therefore, the photoelectric conversion output from the light receiver 610 varies. The moving state (the moving speed and the moving distance) of the shifter 700 can be known from this variation. In other words, the photoelectric conversion signal obtained from the light receiver 610 is approximately a sinusoidal wave. When this signal is made rectangle, an encoder signal that can be increased is obtained.

An LED, an electric bulb, or a semiconductor laser (LD), or the like can be used for the light source 601 of the light source section 600. When the light source can obtain a pattern of reflection and non-reflection with a sufficient contrast based on the reflection sections 652 and the non-reflection sections 651 of the scale 650, this light source can be used without any particular constraint. While the lens 602 is not always necessary, this lens 602 is preferable to increase the light utilization efficiency.

A light receiving element having a suitable sensitivity of the light emitted from the light source 601 can be used for the light receiver 610.

A metal such as Al or Cr may be used to form the reflection section 652 of the scale 650, and this metal may be etched to form the non-reflection section 651. A photo emulsion film may be exposed and developed to form a one-dimensional pattern of transmission and absorption. By forming the metal reflection surface, a reflection type scale may be configured. When the shifter 700 has a belt shape or a drum shape, and when the scale 650 is provided on this surface, the latter scale that makes it possible to form the scale on a resin film can be utilized easily.

The gap holding member 640 is fixed to the slit member 630 to keep a constant interval between the slit member 630 and the scale 650. As the gap holding member 640 is in contact with the scale 650, this member is preferable to have a material and a configuration that do not to damage the scale 650. As described later, the slit member itself can have the function of the gap holding member.

A configuration of a metal having apertures on it as a layout pattern of the non-reflection section is also used for the scale in many cased. In this case, the gap holding member needs to have a size larger than that of the aperture of the non-reflection section, and this member is not scratched with the apertures. The gap holding member preferably uses a resin material having little frictional force so as not to damage the scale.

For the pressing unit 660, a blade spring or the like is used in addition to a coil spring shown in FIG. 16A.

In other words, the encoder according to the present embodiment shown in FIGS. 16A to 16C emits light from the light source section 600 onto the scale 650 that has a portion of a predetermined reflectance arrayed in one-dimensional shape, via the slit member 630 having the apertures 631 each having an aperture width equal to the lattice width of the scale 650. The light receiver 610 detects the light intensity of the light reflected from the scale 650. The encoder detects the displacement of the scale 650 relative to the slit member 630 based on the change in the light intensity detected by the light receiver 610. The encoder includes the gap holding member 640 that keeps a constant gap between the slit member 630 and the scale 650, and the pressing unit 660 that elastically presses the slit member 630 against the scale 650 via the gap holding member 640.

The light source section 600 and the light receiver 610 are accommodated within the sensor casing 620, and the pressing unit 660 is disposed between the sensor casing 610 and the slit member 630.

When the scale is formed on the surface of the belt or the drum, the scale repeats a vertical movement and an angular change due to the ruffling following the move of the shifter. However, according to the encoder of the present invention, the slit member 630 and the scale 650 are set to keep a constant interval via the gap holding member 640. The pressing member 660 presses the slit member 630 against the scale 650 with a constant pressure. Therefore, even when the scale 650 moves up and down or has an inclination, the distance between the slit member 630 and the scale 650 is always held constant. Consequently, it is possible to decrease the damaging of the scale or the slit member due to the contact between the scale 650 and the slit member 630 or the measuring error due to the deviation in the gap or the deviation in the inclination angle.

Figure 17:
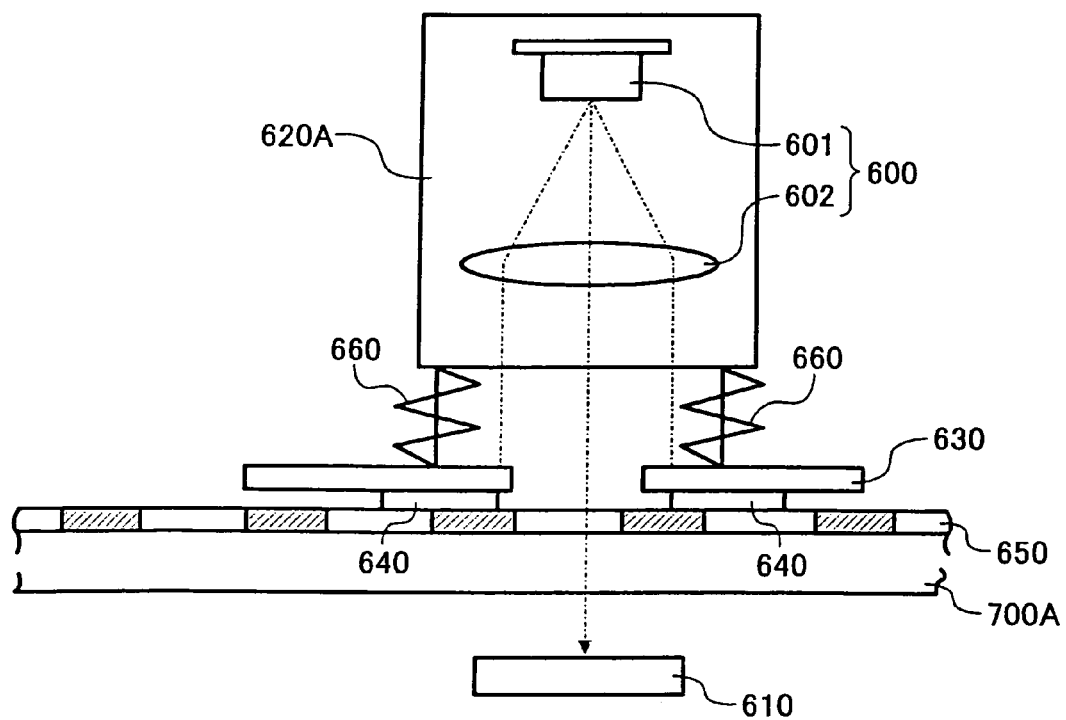
FIG. 17 is an explanatory diagram illustrating another example of the encoder.

FIG. 17 illustrates another example of the encoder. In order to avoid complexity, like portions of the configuration in FIG. 17 are assigned with like reference numerals used in FIGS. 16A to 16C, except where no problem of confusion occurs.

The encoder shown in FIG. 17 emits light from the light source section 600 onto a scale 650A that has a portion of a predetermined reflectance arrayed in one-dimensional shape, via the slit member 630 having apertures each having an aperture width equal to the lattice width of the scale 650A. The light receiver 610 detects the light intensity of the light transmitted through the scale 650A. The encoder detects the displacement of the scale 650A relative to the slit member 630 based on the change in the light intensity detected by the light receiver 610. The encoder includes the gap holding member 640 that keeps a constant gap between the slit member 630 and the scale 650A, and the pressing unit 660 that elastically presses the slit member 630 against the scale 650A via the gap holding member 640.

The light source 601 and the lens 602 that constitute the light source section 600 are accommodated within a sensor casing 620A, and the pressing unit 660 is disposed between the sensor casing 620A and the slit member 630. The slit member 630 is pressed against the scale 650A via the gap holding member 640. The lens 602 is a collimating lens that parallel pencils the light from the light source 601. A shifter 700A transmits light through this unit.

Figure 18:
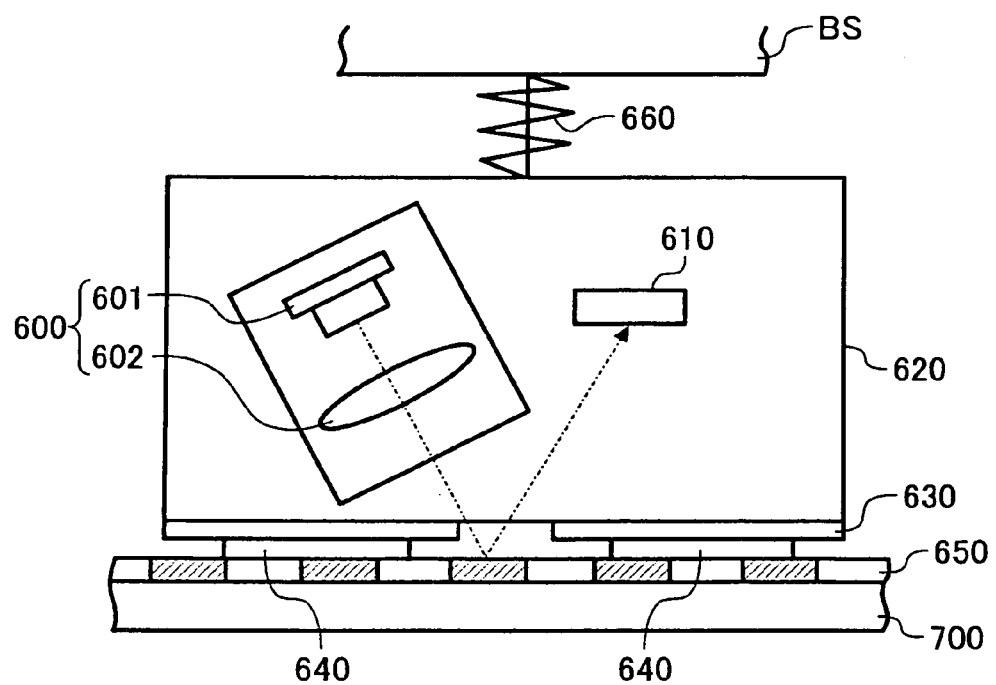
FIG. 18 is an explanatory diagram illustrating still another example of the encoder.

FIG. 18 illustrates still another example of the encoder. In the second embodiment, the light source section 600 and the light receiver 610 are accommodated within the sensor casing 620, and the pressing unit 660 is disposed between a base BS and the sensor casing 620. The sensor casing 620 is pressed against the scale 650. The slit member 630 and the gap holding member 640 are disposed in the sensor casing 620.

In the example shown in FIGS. 16A to 16C, when the scale 650 moves up and down, the gap between the scale 650 and the slit member 630 does not change. However, the distance between the scale 650 and the light source 601 and the distance between the scale 650 and the light receiver 610 change respectively. The light source 601 and the light receiver 610 have a light axis having an angle relative to the scale 650. Therefore, a deviation in the distance from the scale 650 becomes a change in the reflection distance, which changes the quantity of light emitted to the scale 650 and the quantity of light reflected from the scale 650.

In the example shown in FIG. 18, the slit member 630 and the gap holding member 640 fixed to the sensor casing 620, and are closely adhered to the scale 650. Therefore, the gap between the scale 650 and the slit member 630 is held constant. In addition to this, positional relationships between the light source and the scale and between the light receiver and the scale are also held constant. Consequently, a very stable detection of a signal can be achieved.

Figure 19:
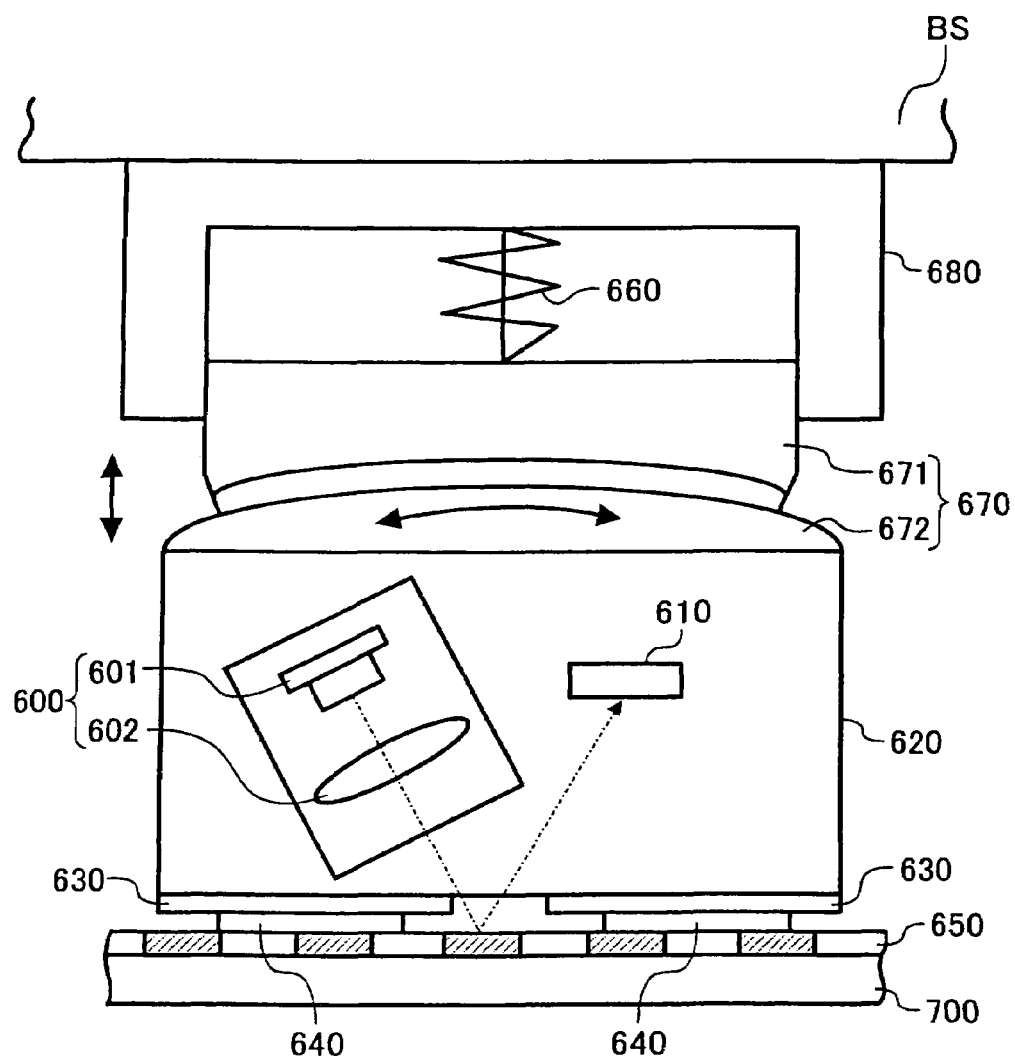
FIG. 19 is an explanatory diagram illustrating still another example of the encoder.

FIG. 19 illustrates still another example of the encoder. In the present example, the sensor casing 620 that accommodates the light source section 600 and the light receiver 610 is held variable around the position at which the light transmitted through the slit member 630 is emitted onto the scale 650.

In other words, a slide rail 672 of a rotation slide rail 670 is fixedly provided to the upper portion of the sensor casing 620 that is at the side opposite to the shifter 700. A slide rail 671 that forms a pair with the slide rail 672 is engaged with a vertical slide rail 680.

The pressing unit 660 is provided between the base BS on which the vertical slide rail 680 is fixed and the vertical slide rail 680. The pressing unit 660 gives a pressing force to the sensor casing 620 toward the scale 650 via the vertical slide rail 680.

The rotation center of the rotation slide rail 670 is set to a position at which the light emitted from the light source 601 is condensed by the lens 602, passes through the aperture of the slit member 630, and emits the surface of the scale 650.

The sensor casing 620 having the rotation guide rail 670 integrated together can be displaced to the up and down directions in FIG. 19. However, the position at which the light from the light source section 600 emits the scale 650 is not displaced due to this linear displacement. Even when the sensor casing 620 is guided by the rotation guide rail 670 and is rotated, the position at which the light from the light source section 600 emits the scale 650 as the rotation center is not displaced.

In the examples shown in FIGS. 16A to 16C and FIG. 18, when the scale 650 is inclined from the position shown, there is a risk that the positional relationship between the slit member 630 and the scale 650 changes. However, in the example shown in FIG. 19, the vertical slide rail 680 and the rotation slide rail 670 are used as sensor holding tools. The sensor holding tools are set to be able to flexibly move in the direction of the gap with the scale 650 (the up and down directions in FIG. 19) and in the direction of rotation with the scale 650. With this arrangement, the rotation center of the rotation slide rail 670 is set to the surface of the scale 650. Therefore, even when the sensor casing 620 is displaced in the vertical direction or in the rotation direction within a movable range, the detection position does not change. In other words, the position at which the light emitted from the light source 601 is condensed by the lens 602, passes through the aperture of the slit member 630, and emits the surface of the scale 650 does not change.

As the pressing unit 660 presses the sensor casing 620 against the scale 650, it is possible to hold the change in the gap between the scale 650 and the sensor casing 620 and the gap between the scale 650 and the slit member 630 respectively. The scale 650 may also be inclined to the direction perpendicular to the drawing. Therefore, it is more effective to use a rotation slide rail that rotates around the detection point, in this direction as well.

In addition to the method of using the rotation slide rail, the method of fixing the detection position to a rotation axis as the rotation center can also obtain a similar effect.

Figure 20A:
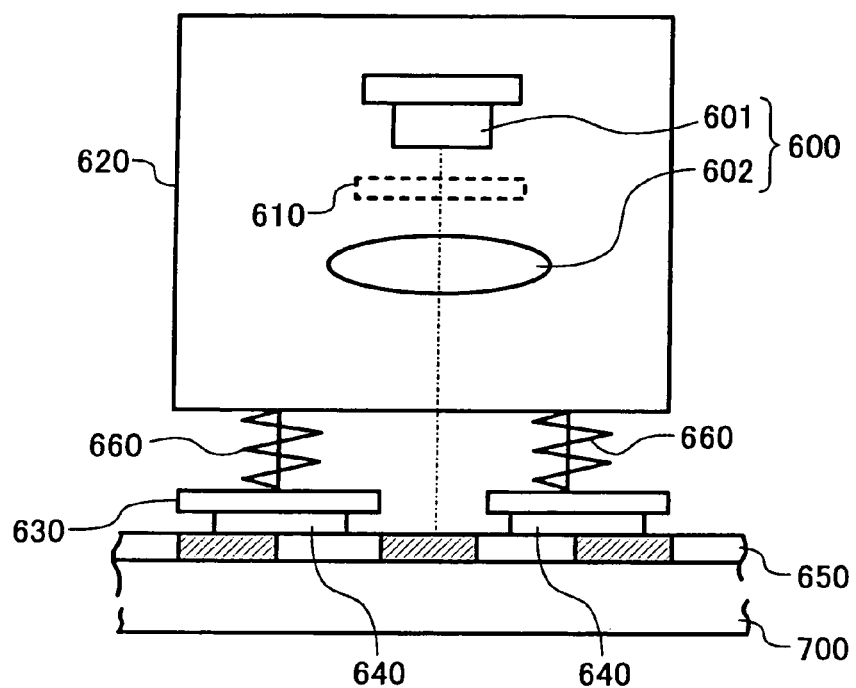
FIGS. 20A and 20B are explanatory diagrams illustrating still another example of the encoder.
Figure 20B:
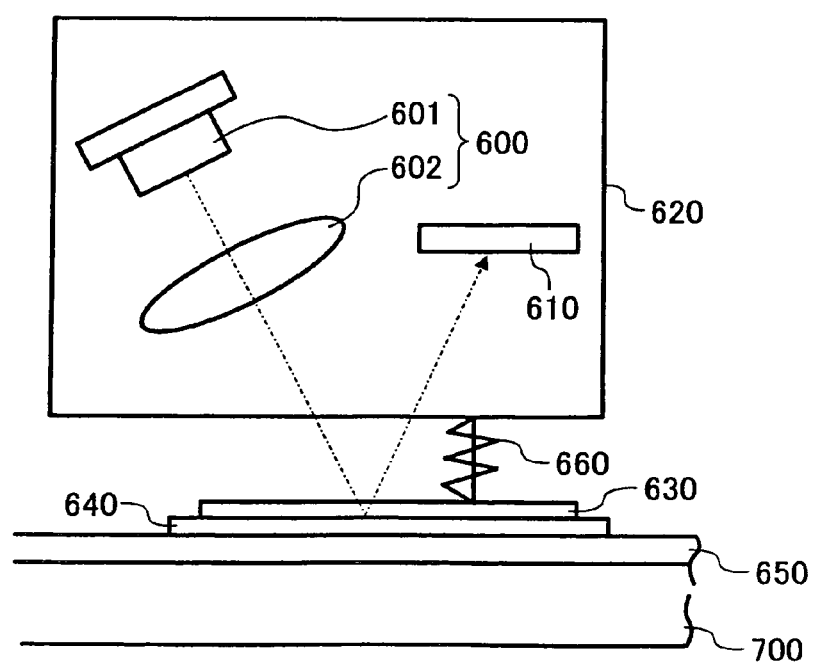

FIGS. 20A and 20B illustrate still another example of the encoder. In this example, as shown in FIG. 20A, the light from the light source section 600 is emitted onto the scale 650 in perpendicular to the moving direction (the left and right direction sin FIG. 20A) of the scale 650.

In the arrangement of the optical system that emits a light flux having an angle onto the scale 650, when the detection distance (the distance between the light source section/light receiver and the surface of the scale 650) varies, the light receiver obtains a signal in the state that the scale 650 moves. When the light flux is emitted to the direction perpendicular to the moving direction of the scale 650 (the direction of the alternate arrangement of the reflection section and the non-reflection section) like in the second embodiment, even when the detection distance varies, there is no change in the relative position between the reflection light in the above direction and the light receiver. Therefore, the light receiver does not generate a change in the signal.

As shown in FIGS. 20A and 20B, in the case of the reflection type sensor, the light receiver 610 receives a regular reflection light from the scale 650. Therefore, it is general that the illumination light flux and the reception light flux mutually form an angle. When this kind of reflection type sensor is used, as shown in FIG. 20B, the illumination light flux and the reception light flux form the angle in a direction perpendicular to the moving direction of the scale 650 (the direction perpendicular to the drawing in FIG. 20B). This direction (the left and right directions in FIG. 20B) corresponds to a longitudinal direction of the rectangular shape of the reflection section and the non-reflection section as shown in FIG. 16B. Therefore, even when the light irradiation position is displaced, there is no variation in the output from the light receiver.

Consequently, the encoder can detect a signal in high precision even when the gap between the slit member and the scale changes large to the extent that the gap is deviated from the limit of the gap holding member.

According to each example explained above, the light-condensing lens 602 is used for the light source section 600, thereby to condense the light from the light source section 601, and emit the light onto the scale 650. It is preferable that this lens 602 is the collimating lens in each embodiment.

When the light that is emitted onto the scale 650 is divergent pencil rays or a convergent light flux, the divergent pencil rays are divergent and the convergent light flux converges even after passing through the slit member 630. Therefore, it is difficult that the light flux cross-sectional shape of the light flux after passing through the slit member maintains the shape of the aperture of the slit member.

In this state, when the gap between the slit member and the scale has a certain size, and when the gap varies due to the deformation of the gap holding member, the diameter of the light flux that the light receive receives changes, which generates a measuring error.

When the light flux emitted from the light source section is a parallel light flux like that in the encoder, the light flux can hold approximately the same diameter even if the light flux proceeds to some extent after passing through the aperture of the slit member. Therefore, even when the gap varies, the detection precision can be maintained.

An LED is used for the light source of the encoder for the cost reason. A usual LED has a large light emitting area. Even when a lens is used to condense light, the lens cannot completely make the light into a parallel light flux because of low space coherence. When a more parallel light flux is necessary, it is preferable to use an LD of a small light source area or a point source LED for the light source.

Figure 21:
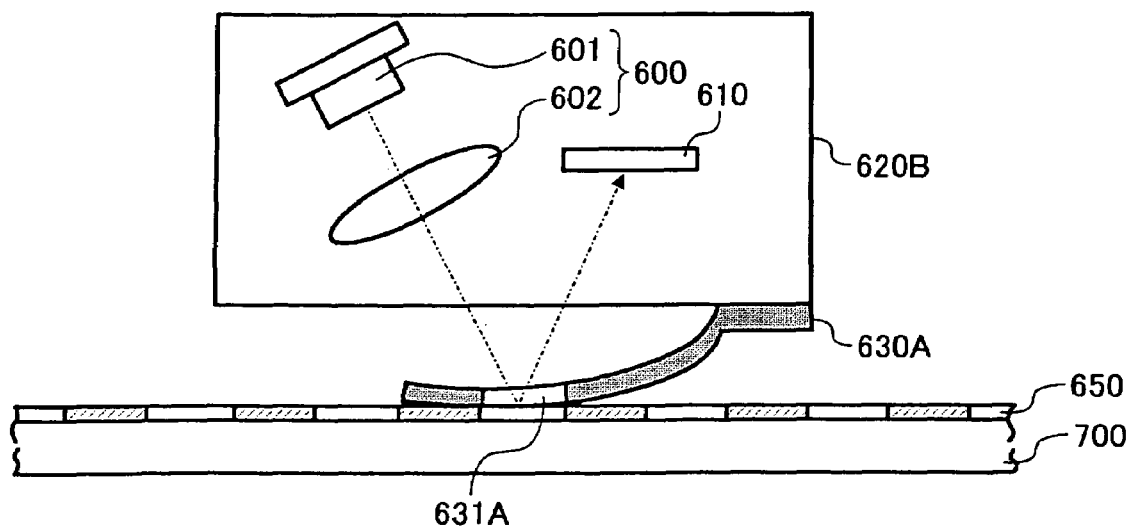
FIG. 21 is an explanatory diagram illustrating still another example of the encoder.

FIG. 21 illustrates still another example of the encoder. In the present example, a slit member 630A is configured as a spring member that is formed with an aperture 631A. When one end of the spring member is fixed to a sensor casing 620B, this spring member works as both a gap holding member and a pressing unit.

The spring member that forms the slit member 630A may be a sheet spring, or may be a sheet spring member that is adhered with a slit member, or may be a resin film. When the resin film is used for the spring member, a metal deposition film is formed on a transparent film surface, and the aperture 631A is formed on this metal deposition film by etching or the like.

Alternatively, the resin film can be formed to have an aperture pattern according to an absorption section and a transmission section for the wavelength of the light emitted from the light source section 600.

As explained above, the slit member has the function of the gap holding member and the pressure member, like the sheet spring slit member. With this arrangement, the encoder can be configured easily, which lowers cost and improves the easiness of assembling.

As explained in the above example, in the encoder according to the present invention, the gap holding member or the slit member having the gap holding member is brought into contact with the scales is pressed, and slides against the scale. Therefore, in order to increase the durability of the scale, it is preferable to have a lubricating unit that lubricates between the scale and the gap holding member.

A suitable lubricating unit is available depending on a relationship between the gap holding member and the scale material. For example, when the scale is metal or the like, lubricating oil can be provided between the scale and the gap holding member. When the scale is made of a resin, the gap holding member can be formed using a resin including fluoride such as PEFE. With this arrangement, the gap formation member may also work as the lubricating unit. Alternatively, the lubricating unit may be configured as the one that coats a lubricant onto between the gap holding member and the scale.

When the lubricating unit is used, the durability of the slit member and the scale can be improved.

Figure 22:
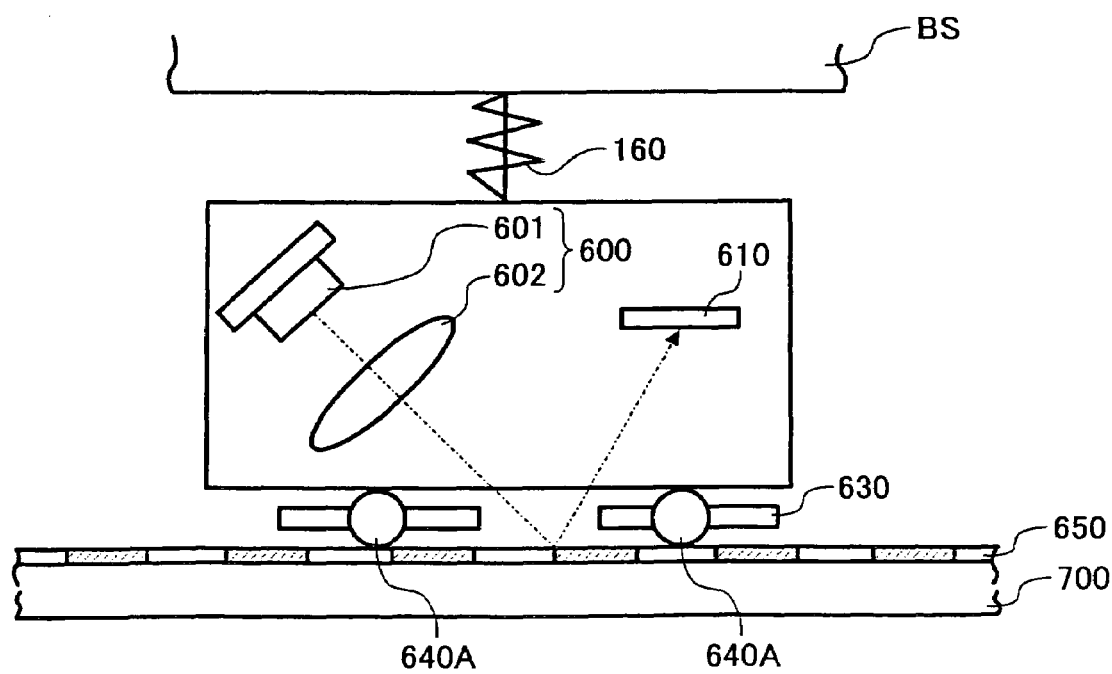
FIG. 22 is an explanatory diagram illustrating still another example of the encoder.

FIG. 22 illustrates still another example of the encoder. This encoder has a gap holding member 640A as a roller, which is in rotational contact with the scale. When the roller that can freely rotate as the gap holding member 640A is used, the scale 650 is not easily damaged. At the same time, the gap between the sensor casing 620 and the scale 650 can be controlled.

For the gap holding member, a ball member can also be used in addition to the roller shown in FIG. 22. When the roller or the ball member is used for the gap holding member, the gap member can also function as a lubricating unit.

Figure 23A:
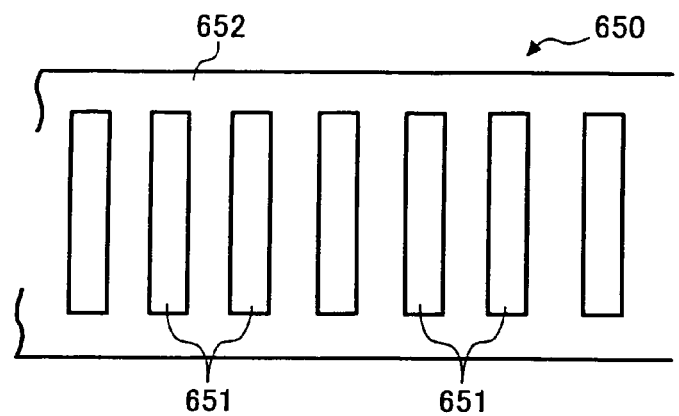
FIGS. 23A to 23C are explanatory diagrams of a characteristic of the encoder according to still another example.
Figure 23B:
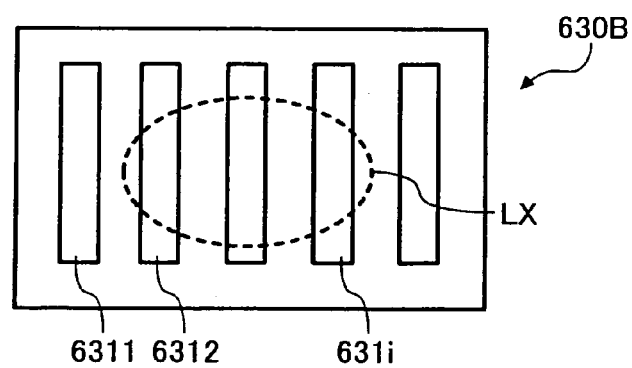

FIGS. 23A and 23B are explanatory diagrams of characteristic portions of the encoder. In the examples explained with reference to FIGS. 16A to 16C to FIG. 22, the slit member 630 or 630A has a single aperture. However, a slit member 630B shown in FIG. 23B has a plurality of apertures 6311, 6312, ..., 631i, etc. in a one-dimensional lattice layout direction of the scale 650 (the left and right directions in FIG. 23B). The plurality of apertures 631i is laid out in the same shape and at the same pitch as those of the non-reflection sections 651 in the scale 650 shown in FIG. 23A.

When the slit member has the apertures 631i as shown in FIG. 23B, a plurality of reflection sections and non-reflection sections of the scale can be read even when the scale 650 is damaged. Therefore, a signal can be detected stably.

Figure 23C:
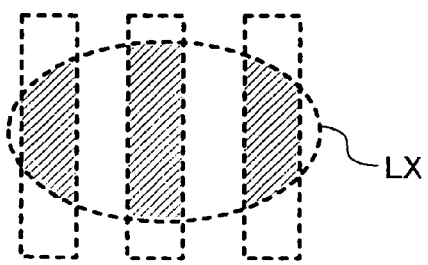

FIG. 23C illustrates a cross-sectional shape of an oblong light flux LX shown in FIG. 23B when the light fluxes passes through the slit member 630B upon irradiation to the slit member 630B.

Figure 24:
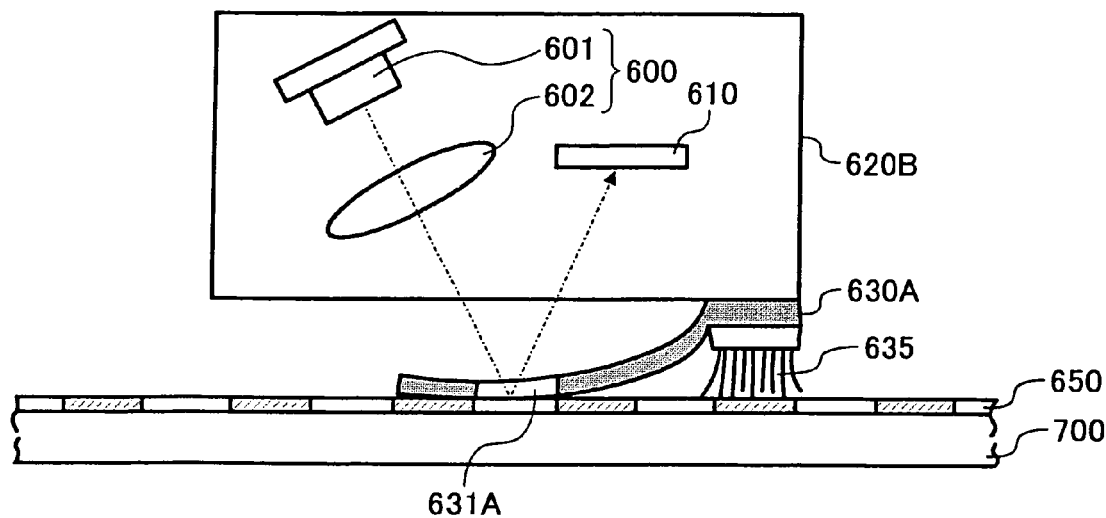
FIG. 24 is an explanatory diagram illustrating another example of the encoder.

FIG. 24 illustrates an example of the application of the present invention to the encoder shown in FIG. 21. In other word, the encoder according to this example has a cleaning member 635 that cleans the scale 650. In this example, the cleaning member 635 has a brush shape and is fixed to the slit member 630A in the vicinity of the end of the sensor casing 620B to which the slit member 630A working as the pressing unit and the gap holding member is fixed. The front end of the brush slides against the surface of the scale 650, and keeps the scale 650 always clean.

As explained above, it is always possible to clean the surface of the scale 650 clean. The scale 650 can be protected from being damaged due to the adhering of dust onto the surface. As the scale 630A also works as a pressing unit, the cleaning member 635 is pressed against the scale 650 at a constant pressure. Therefore, the cleaning effect can be held constant.

Figure 25:
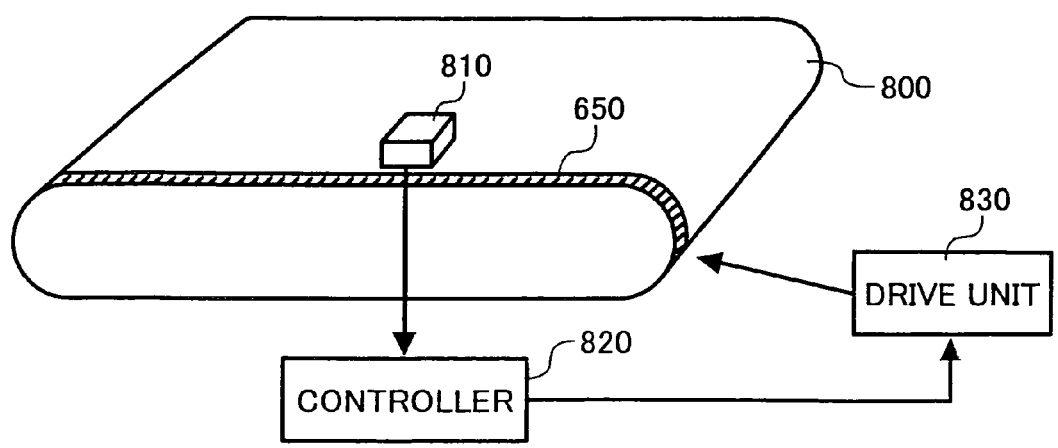
FIG. 25 is an explanatory diagram illustrating one example of a shifter.

FIG. 25 illustrates one example of a drive control device that serves as a shifter. In this example, a shifter 800 is an intermediate transfer belt, which is formed in an endless belt shape and is rotated in one direction. The scale 650 is formed at one peripheral side of the surface of the intermediate transfer belt 800 in the axial direction. An encoder 810 includes a light source section, a light receiver, a slit member, a gap holding member, and a pressing unit, thereby to constitute the entire encoder device together with the scale 650.

During the running of the intermediate transfer belt 800, the output from the encoder 810 is input to a controller 820 such as a microcomputer or a CPU. The controller 820 controls a drive unit 830 such as a motor that drives the intermediate transfer belt 800 according to the output signal from the encoder 810. With this arrangement, the running speed and the running distance of the intermediate transfer belt 800 can be controlled stably in high precision.

Figure 26:
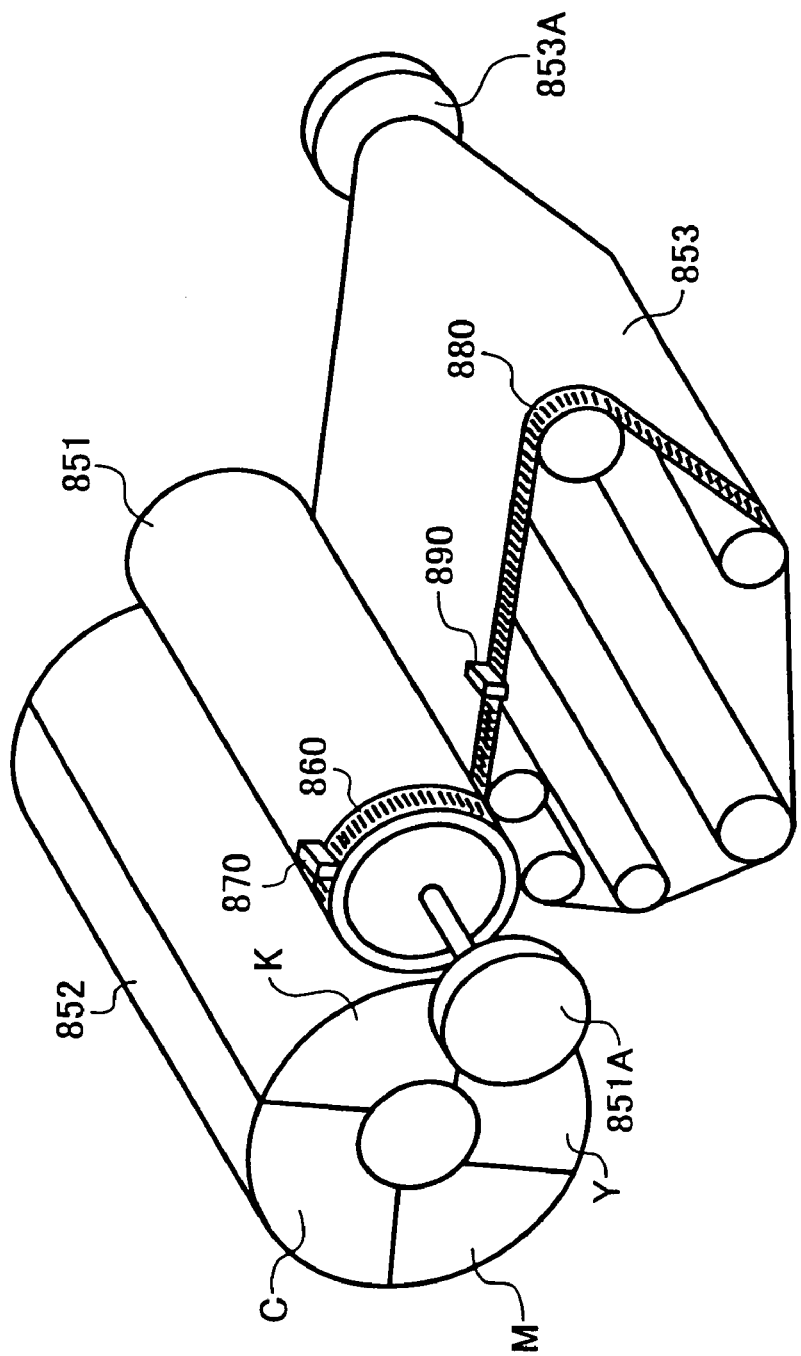
FIG. 26 is an explanatory diagram illustrating one example of an image forming apparatus.

FIG. 26 illustrates one example of the image forming apparatus. The image forming apparatus is used to form a color image.

A photoconductive photosensitive unit as a latent image holder 851 is formed in a drum shape, and is rotated in a counterclockwise direction by the driving section 851A. During the image formation, a photosensitive unit 851 rotates at a constant speed. A charging unit (not shown) uniformly charges the surrounding of the photosensitive unit. An exposing unit such as a light scanner not shown exposes the photosensitive unit 851 to form electrostatic latent images.

The electrostatic latent images include color components of black, yellow, magenta, and cyan corresponding to a black color image, a yellow color image, a magenta color image, and a cyan color image respectively. These electrostatic latent images are sequentially formed in this order. First, a black developing unit K of a revolver developing unit 852 develops the black color electrostatic latent image with a black toner thereby to form a black toner image. The black toner image is transferred onto an intermediate transfer belt 853. A driving section 853A rotates the intermediate transfer belt 853 in the clockwise direction at approximately the same linear velocity as that of the photosensitive unit 851.

After the transfer of the black toner image, a cleaning unit not shown removes a residual black toner from the photosensitive unit 851. A current remover not shown removes the current from the photosensitive unit 851. A charger not shown charges the photosensitive unit 851. The exposing unit forms the yellow electrostatic latent image.

A yellow developing unit Y of the revolver developing unit 852 develops the yellow electrostatic latent image with a yellow toner thereby to form a yellow toner image. The yellow toner image is transferred onto the intermediate transfer belt 853 in superimposition with the black toner image already transferred onto the intermediate transfer belt 853.

Similarly, the magenta electrostatic latent image, and the cyan electrostatic latent image are formed sequentially. A magenta developing unit M and a cyan developing unit C of the revolver developing unit 852 develop these electrostatic latent images to form a magenta toner image and a cyan toner image respectively. The magenta toner image and the cyan toner image are transferred onto the intermediate transfer belt 853.

A color image having the black, yellow, magenta, and cyan color toner images superimposed together is obtained on the intermediate transfer belt 853. A transfer unit not shown transfers this color image from the intermediate transfer belt 853 onto a sheet recording medium such as transfer paper, and fixes the color image to obtain a desired color image.

A scale 860 is formed around one edge in the axial direction of the photosensitive unit 851. An encoder 870 reads this scale 860. A scale 880 is formed around one edge in the axial direction of the intermediate transfer belt 853. An encoder 890 reads this scale 880.

The scale 860 and the encoder 870, and the scale 880 and the encoder 890 constitute the entire encoder device according to the present invention, in configurations as shown in FIGS. 16A to 16C and FIG. 18 to FIG. 24.

These encoder devices can stably detect in high precision the sunning state of the photosensitive unit 851 on the peripheral surface and the running state of the intermediate transfer belt 853, that is, the running speed and the running distance these units respectively. As a result, the running state can be controlled satisfactorily. Each color toner image can be transferred in high precision, thereby to obtain a satisfactory color image.

Figure 27:
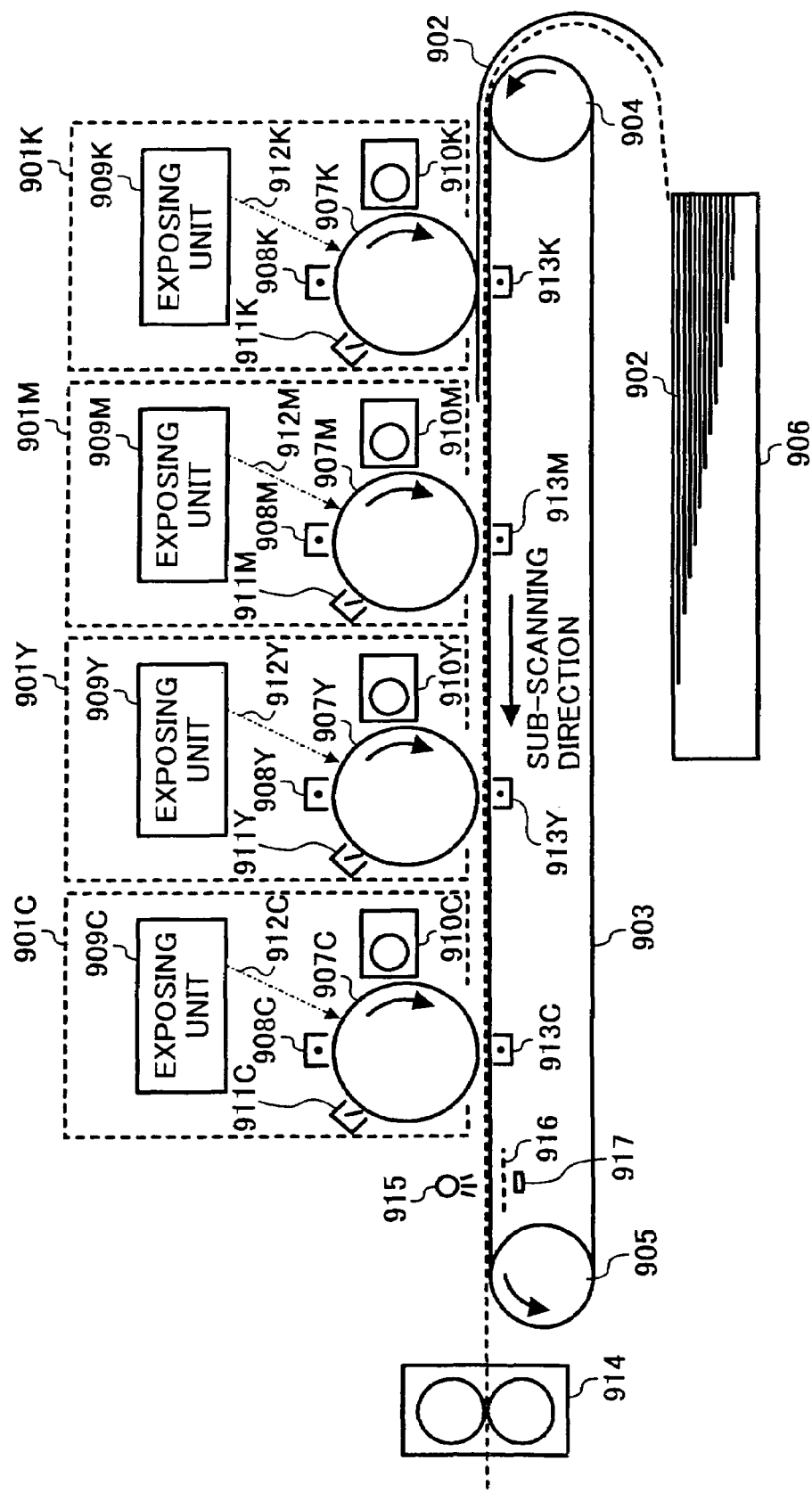
FIG. 27 is an explanatory diagram illustrating another example of an image forming apparatus.

FIG. 27 illustrates another example of the image forming apparatus as a tandem type color image forming apparatus.

According to this color image forming apparatus, a plurality of workstations 901K, 901M, 901Y, and 901C are laid out sequentially from the upstream (the right side in the drawing) of a sheet conveyer belt 903 that conveys transfer paper 902 as a sheet recording medium, along the conveying surface of the sheet conveyer belt 903.

A black toner image, a magenta toner image, a yellow toner image, and a cyan toner image are formed in this order onto the workstations 901K, 901M, 901Y, and 901C respectively. The operation of each workstation is similar except the color of the toner that is used for the development. Therefore, the image formation in the workstation 901K will be explained as a representative.

In FIG. 27, K denotes a black, M denotes M, Y denotes yellow, and C denotes cyan.

The workstation 901K includes a charger 908K, an exposure unit 909K, a developing unit 910K, and a cleaning unit 911K. The exposure unit 909K is a light scanner that optically scans with a laser beam. A polygon mirror deflects a laser beam from a laser light source. The light is emitted as an exposure light flux via an optical system using an fϕ lens or a deflection mirror.

In forming an image, the charger 908K uniformly charges a photosensitive unit 907K in the dark. An exposure unit 908Y exposes the photosensitive unit 907K to write the black image according to light scanning using an exposure light 912K, thereby to form the black electrostatic latent image. The developing unit 910K develops the black electrostatic latent image to form the black toner image using the black toner.

Similarly, the workstations, 901M, 901Y, and 901C form the magenta, yellow, and cyan toner images onto the photosensitive units 907M, 907Y, and 907C respectively.

The sheet conveyer belt 903 is formed as an endless belt, which is applied to a driving roller 905 and a subordinate roller 904, and is rotated in the counterclockwise direction.

A paper tray 906 disposed at a lower side of the sheet conveyer belt 903 accommodates the transfer paper 902. When the image formation process is executed, the paper tray 906 supplies the top transfer paper 902. The sheet conveyer belt 903 electrostatically absorbs the supplied transfer paper 902, and conveys the transfer paper 902 by rotation. Transfer units 913K, 913M, 913Y, and 913C transfer the black toner image, the magenta toner image, the yellow toner image, and the cyan toner image, in the workstations 901K, 901M, 901Y, and 901C respectively.

After the transfer of the toner images, the cleaning units 911K, 911M, 911Y, and 911C clean the photosensitive units 907K, 907M, 907Y, and 907C respectively to prepare for the next image formation process.

The color image is formed onto the transfer paper 902 by superimposing the four color toner images in the manner described above. The transfer paper 902 is separated from the sheet conveyer belt 903. A fixing unit 914 fixes the image on the transfer paper 902, and discharges the transfer paper 902 to the outside of the apparatus.

Figure 28:
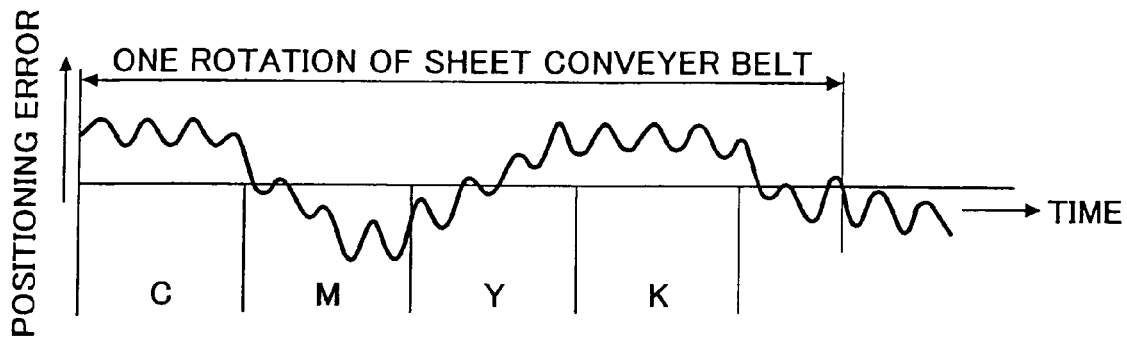
FIG. 28 is an explanatory diagram illustrating a positional error of a sheet conveyer belt.
Figure 29:
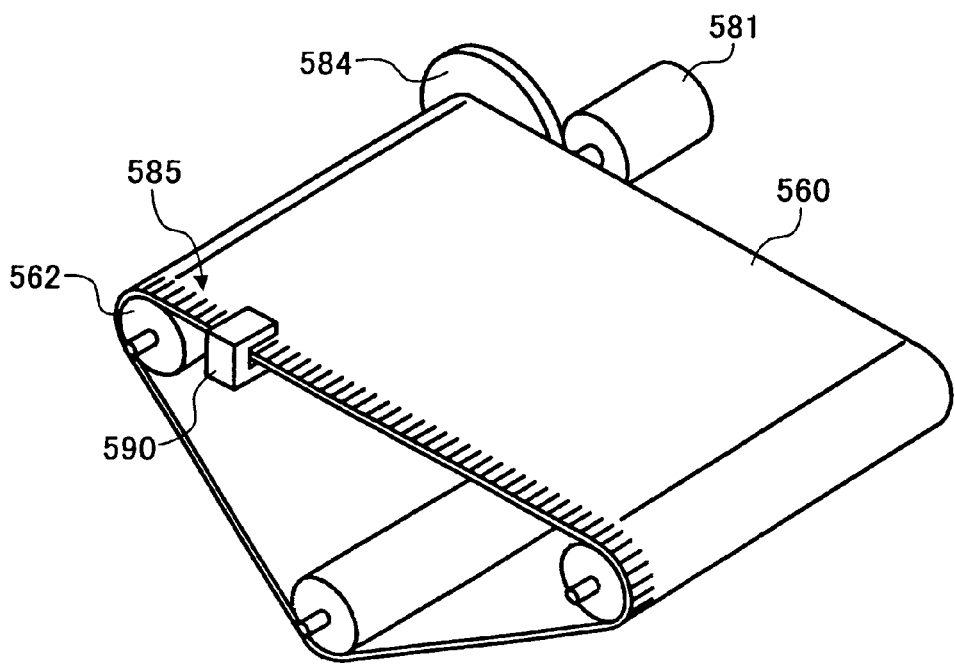
FIG. 29 is a schematic diagram of a conventional belt drive unit that drives a belt member.
Figure 30A:
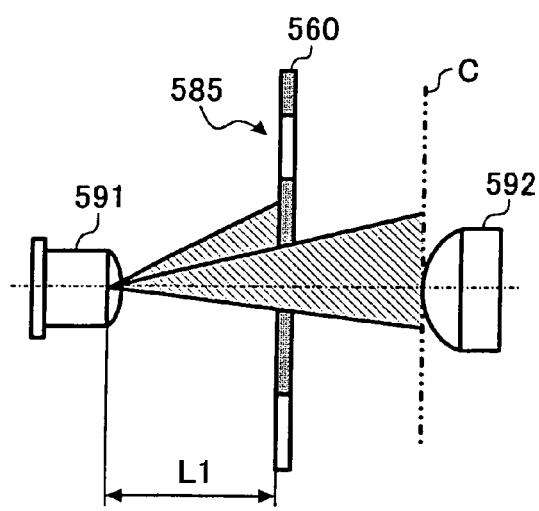
FIGS. 30A and 30B are enlarged diagrams illustrating a portion of a belt member facing a mark sensor.
Figure 30B:
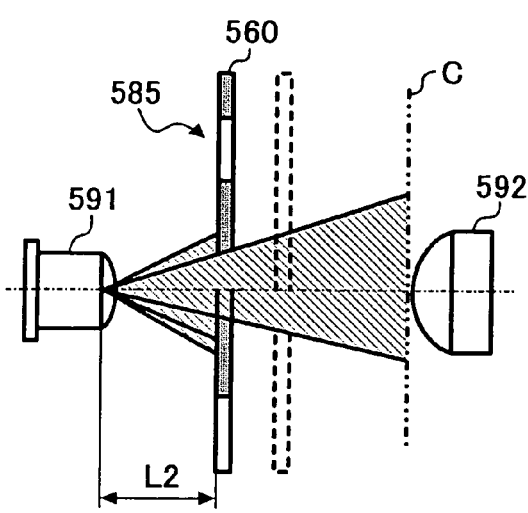
Figure 30C:
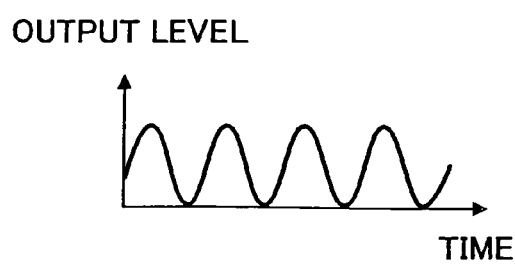
FIGS. 30C and 30D are graphs illustrating output waveforms of the mark sensor corresponding to FIGS. 30A and 30B respectively.
Figure 30D:
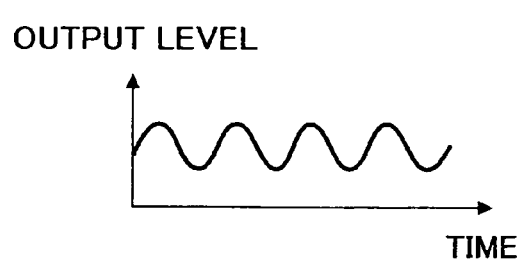

According to the tandem type color image forming apparatus shown in FIG. 27, the positioning error due to the deviation in the linear velocity of the sheet conveyer belt and the photosensitive unit changes according to the waveform having a plurality of frequency components as shown in FIG. 28 because of unevenness in the thickness of the sheet conveyer belt, eccentricity of the driving and subordinate rollers, variation in the speed of the driving motor, or the like. Therefore, the output image obtained after having the images superimposed together has a positional variation, which causes degradation in the image quality such as a color distortion and a color change.

When the photosensitive units 7K to 7C and the intermediate transfer belt 903 are formed to have the configurations as the shifter according to the present invention, it is possible to detect in high precision the running state of these photosensitive units and the intermediate transfer belt. Therefore, the running state can be controlled satisfactorily. It becomes possible to effectively decrease the image degradation such as the color distortion and color change in the formed color image.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical encoder comprising:
   a light emitting unit that emits parallel light onto a plurality of marks that are arranged on an object at a predetermined interval in a moving direction of the object; and
   a light receiving unit that receives light modulated by the marks, wherein
   a width, along the moving direction of the object, of the light emitted from the light emitting unit is shorter than the predetermined interval.

2. The optical encoder according to claim 1, wherein the light emitting unit includes
   a light source; and
   a collimating lens that collimates light emitted from the light source to generate the parallel light.

3. The optical encoder according to claim 1, wherein the light receiving unit receives light passing through the marks as the light modulated by the marks.

4. The optical encoder according to claim 1, wherein the light receiving unit receives light reflected from the marks as the light modulated by the marks.

5. The optical encoder according to claim 1, wherein the object is a rotor that is turned by a motor.

6. The optical encoder according to claim 1, wherein the light emitting unit emits light in a direction normal to a surface of the object on which the marks are arranged.

7. The optical encoder according to claim 1, further comprising:
a splitter that transmits the light emitted from the light emitting unit to the marks, and that guides light reflected from the marks to the light receiving unit.

8. An optical encoder comprising:
a light emitting unit that emits light onto a plurality of marks that are arranged on an object at a predetermined interval in a moving direction of the object; and
a light receiving unit that receives light modulated by the marks, wherein
a cross-sectional shape of the light emitted from the light emitting unit has a longer width in a direction perpendicular to the moving direction of the object.

9. The optical encoder according to claim 8, wherein the object is a belt supported by a plurality of supporting members, and the belt is moved by a motor.

10. The optical encoder according to claim 8, wherein the light emitting unit emits light in a direction perpendicular to the moving direction of the object.

11. An optical encoder comprising:
a light emitting unit that emits parallel light onto a plurality of marks that are arranged on an object at a predetermined interval in a moving direction of the object; and
a light receiving unit that receives light modulated by the marks, wherein
the light emitting unit emits a plurality of beams so that an interval between the beams at a surface of the object is an integer times the predetermined interval.

12. The optical encoder according to claim 11, wherein the light emitting unit includes
a light source;
a collimating lens that collimates light emitted from the light source to generate the parallel light; and
a slit member that split splits the parallel light into the plurality of beams.

13. An optical encoder comprising:
a light emitting unit that emits light onto a plurality of marks that are arranged on an object at a predetermined interval in a moving direction of the object;
a light receiving unit that receives light modulated by the marks;
a slit member that has an aperture whose width is approximately equal to the predetermined interval, the light emitted from the light emitting unit passing through the aperture;
a gap holding member that holds the slit member so that there is substantially a constant gap between the slit member and the marks; and
a pressing member to elastically press the slit member against the marks through the gap holding member.

14. The optical encoder according to claim 13, wherein the light receiving unit receives light passing through the marks as the light is modulated by the marks.

15. The optical encoder according to claim 13, wherein the light receiving unit receives light reflected from the marks as the light is modulated by the marks.

16. The optical encoder according to claim 13, wherein the object is a belt supported by a plurality of supporting members, and the belt is moved by a motor.

17. The optical encoder according to claim 13, wherein the object is a rotor that is turned by a motor.

18. The optical encoder according to claim 13, further comprising a casing that houses the light emitting unit and the light receiving unit, wherein the pressing member is disposed between the slit member and the casing.

19. The optical encoder according to claim 13, further comprising:
a casing that houses the light emitting unit and the light receiving unit, wherein
the slit member is disposed on the casing, and
the pressing member is disposed between the casing and a support base and presses the casing against the marks through the slit member and the gap holding member.

20. The optical encoder according to claim 13, further comprising
a casing that houses the light emitting unit and the light receiving unit, and that is movably supported around a position at which the light reaches a surface of the object.

21. The optical encoder according to claim 13, wherein the light emitting unit emits light in a direction perpendicular to the moving direction of the object.

22. The optical encoder according to claim 13, wherein the light emitting unit includes
a light source; and
a collimating lens that collimates light emitted from the light source to generate the parallel light.

23. The optical encoder according to claim 13, wherein the slit member, the gap holding member, and the pressing member are integrated as a spring member having the aperture.

24. The optical encoder according to claim 23, wherein the spring member is a sheet spring.

25. The optical encoder according to claim 23, wherein the spring member is a resin film.

26. The optical encoder according to claim 25, wherein the resin film includes
a transparent film; and
a metal film that is formed on the transparent film and that has the aperture.

27. The optical encoder according to claim 25, wherein the resin film has an aperture pattern formed by a first area and a second area, the first area is made of a material that absorbs the light emitted from the light emitting unit, and the second area is made of a material that transmits the light.

28. The optical encoder according to claim 13, further comprising:
a lubricating unit that lubricates a surface, which faces toward the gap holding member, of the object.

29. The optical encoder according to claim 28, wherein the lubricating unit applies a lubricant on the surface of the object.

30. The optical encoder according to claim 13, wherein the gap holding member includes a rotor that comes in contact with the marks and is turned with movement of the object.

31. The optical encoder according to claim 13, wherein the slit member has a plurality of apertures that are arranged in the moving direction of the object.

32. The optical encoder according to claim 13, further Comprising:
a cleaning member that cleans the marks.

33. A driver for a motor to move an object, comprising:
an optical encoder that includes
a light emitting unit that emits light onto a plurality of marks that are arranged on an object at a predetermined interval in a moving direction of the object;
a light receiving unit that receives light modulated by the marks;
a slit member that has an aperture whose width is approximately equal to the predetermined interval, the light emitted from the light emitting unit passing through the aperture;

a gap holding member that holds the slit member so that there is substantially a constant gap between the slit member and the marks; and a pressing member to elastically press the slit member against the marks through the gap holding member; and a motor controller that controls the motor based on a signal output from the light receiving unit.

34. An image forming apparatus, comprising:

an object on which a plurality of marks are arranged at a predetermined interval in a moving direction of the object;

a motor to move the object;

an optical encoder that includes a light emitting unit that emits light onto the marks;

a light receiving unit that receives light modulated by the marks;

a slit member that has an aperture whose width is approximately equal to the predetermined interval, the light emitted from the light emitting unit passing through the aperture;

a gap holding member that holds the slit member so that there is substantially a constant gap between the slit member and the marks; and a pressing member to elastically press the slit member against the marks through the gap holding member; and a motor controller configured to control the motor based on a signal output from the light receiving unit.

35. A method of driving a motor to move an object on which a plurality of marks are arranged at a predetermined interval in a moving direction of the object, the method comprising:

pressing a slit member against the marks so that there is substantially a constant gap between the slit member and the marks, the slit member having an aperture;

emitting parallel light onto the marks so that the light passes through the aperture;

converting light modulated by the marks into an electric signal; and controlling the motor based on the electric signal.

* * * * *